United States Patent [19]
Bender et al.

[11] Patent Number: 6,070,189
[45] Date of Patent: May 30, 2000

[54] SIGNALING COMMUNICATION EVENTS IN A COMPUTER NETWORK

[75] Inventors: Carl A. Bender, Highland; Paul D. DiNicola, Hurley; Kevin J. Gildea, Bloomington; Rama K. Govindaraju; Chulho Kim, both of Poughkeepsie; Jamshed H. Mirza, Woodstock; Gautam H. Shah, Wappingers Falls, all of N.Y.; Jaroslaw Nieplocha, Richland, Wash.

[73] Assignee: International Business Machines Corporation, Armonk, N.Y.

[21] Appl. No.: 08/921,757

[22] Filed: Aug. 26, 1997

[51] Int. Cl.[7] ..................................... G06F 13/00
[52] U.S. Cl. ............................................ 709/224
[58] Field of Search ................................... 709/200, 201, 709/217, 218, 219, 224, 234, 236, 237

[56] References Cited

U.S. PATENT DOCUMENTS

| | | | |
|---|---|---|---|
| 4,918,687 | 4/1990 | Bustini et al. | 370/235 |
| 4,995,056 | 2/1991 | Fogg, Jr. et al. | 375/220 |
| 5,036,459 | 7/1991 | den Haan et al. | 709/237 |
| 5,105,382 | 4/1992 | Ogasawara | 710/46 |
| 5,307,345 | 4/1994 | Lozowick et al. | 370/428 |
| 5,375,070 | 12/1994 | Hershey et al. | 364/550 |
| 5,410,536 | 4/1995 | Shah et al. | 370/216 |
| 5,412,651 | 5/1995 | Corshe | 370/412 |
| 5,418,912 | 5/1995 | Christenson | 709/234 |
| 5,666,484 | 9/1997 | Orimo et al. | 714/18 |
| 5,737,535 | 4/1998 | Bagley et al. | 709/227 |
| 5,781,801 | 7/1998 | Flanagan et al. | 710/56 |

FOREIGN PATENT DOCUMENTS

| | | |
|---|---|---|
| 0 294 890 | 12/1988 | European Pat. Off. . |
| 2 195 038 | 3/1988 | United Kingdom . |

OTHER PUBLICATIONS

Harvey M. Deitel: "An Introduction to Operating Systems", 1984, Addison–Wesley, pp. 74–97.

Primary Examiner—Moustafa M. Meky
Attorney, Agent, or Firm—Floyd A. Gonzalez

[57] ABSTRACT

A method, apparatus and program product for detecting a communication event in a distributed parallel data processing system in which a message is sent from an origin to a target. A low-level application programming interface (LAPI) is provided which has an operation for associating a counter with a communication event to be detected. The LAPI increments the counter upon the occurrence of the communication event. The number in the counter is monitored, and when the number increases, the event is detected. A completion counter in the origin is associated with the completion of a message being sent from the origin to the target. When the message is completed, LAPI increments the completion counter such that monitoring the completion counter detects the completion of the message. The completion counter may be used to insure that a first message has been sent from the origin to the target and completed before a second message is sent.

29 Claims, 4 Drawing Sheets

SIGNALING COMMUNICATION EVENTS IN A COMPUTER NETWORK

BACKGROUND OF THE INVENTION

The present invention is related to communications in a computer network and is more particularly related to signalling various events associated with non-blocking communications calls initiated by a task of a parallel job in a distributed parallel data processing system.

In a distributed parallel data processing system a communication mechanism is provided to allow users to communicate between different tasks of a parallel job. Typically to alleviate the effect of communication delays a user is allowed to overlap computation with communication by the use of nonblocking communication calls. When a nonblocking call is invoked, the user needs to know when the call in question has "completed". There are many reasons to know that a nonblocking call has completed—for instance the user may have to free up resources used in the non-blocking calls or the user may want to reuse buffers provided to the nonblocking call.

In order to permit a high degree of concurrency, a low-level application programming interface (LAPI), to be described, defines three types of events associated with nonblocking calls which indicate whether (1) resources of a message are available at origin (2) resources of a message are available at target and (3) a particular message has completed (as related to the origin and target) with respect to the requestor.

Various solutions have been proposed to recognize events associated with nonblocking communication calls. Most previous solutions (MPI is one example) require a distinct handle per message of the user. A distinct handle per message requires more storage and may also be less efficient because it requires the user to check on each of these individually. MPI attempts to alleviate this problem by providing "wait_any" and "wait_all". However these still require a handle per message and thus the implementation is also expected to be more complex.

Further, MPI has a notion of standard and synchronous messages in order to allow the user to specify the type of nonblocking behavior required. This makes the use of the API more cumbersome since it burdens the user to have to select a particular interface.

SUMMARY OF THE INVENTION

The present invention provides a convenient and efficient mechanism for signalling to the user various events associated with nonblocking communication calls initiated by a task of a parallel job thus allowing the user a common quick method to check on communication events.

The present invention uses counters to signal the events associated with the nonblocking communication calls. The specified counter is incremented whenever the event associated with the counter occurs. By checking the value of the counter the user can determine if the event (associated with the counter by the user) in question has occurred.

In the present invention, interfaces that involve nonblocking communication take in as parameters different counters to signal events associated with the communication call in question. The counter structure is defined, and the user is expected to access the counter only using the defined interfaces. However, the user specifies the counters and the relationship of a counter to a message/event. The user may use the same counter across multiple messages. This gives the user the freedom to group different communication calls with the same counter and check their completion as a group.

A library which updates the user specified counters when a particular event (or one of the events) with which the counter was associated has occurred. The user can check on the status of a particular event by polling on the value of the appropriate counter; this polling is done using a LAPI specified interface. If a user wants to wait on a particular event rather than check if it has occurred, LAPI provides an interface to wait on the counter until the counter reaches the specified value. This is a blocking interface. If the user waits for the counter to reach a specific value, then when LAPI returns from the wait, the counter value is decremented by the value (which indicates the number of events) specified in the wait.

The present invention allows the same counter to be associated with multiple messages.

By providing the counter solution, a single interface representing the MPI standard and synchronous calls are provided. However, the ability to specify different types of nonblocking behavior is still maintained. The user can simulate either standard or synchronous behavior by specifying appropriate counters and waiting on them at the appropriate places in the code. And the user can mix the use as needed by the application making this more flexible.

The present invention provides flexibility to the user that is not provided in the other solutions. Further the present invention enables efficient implementations and uses less storage.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
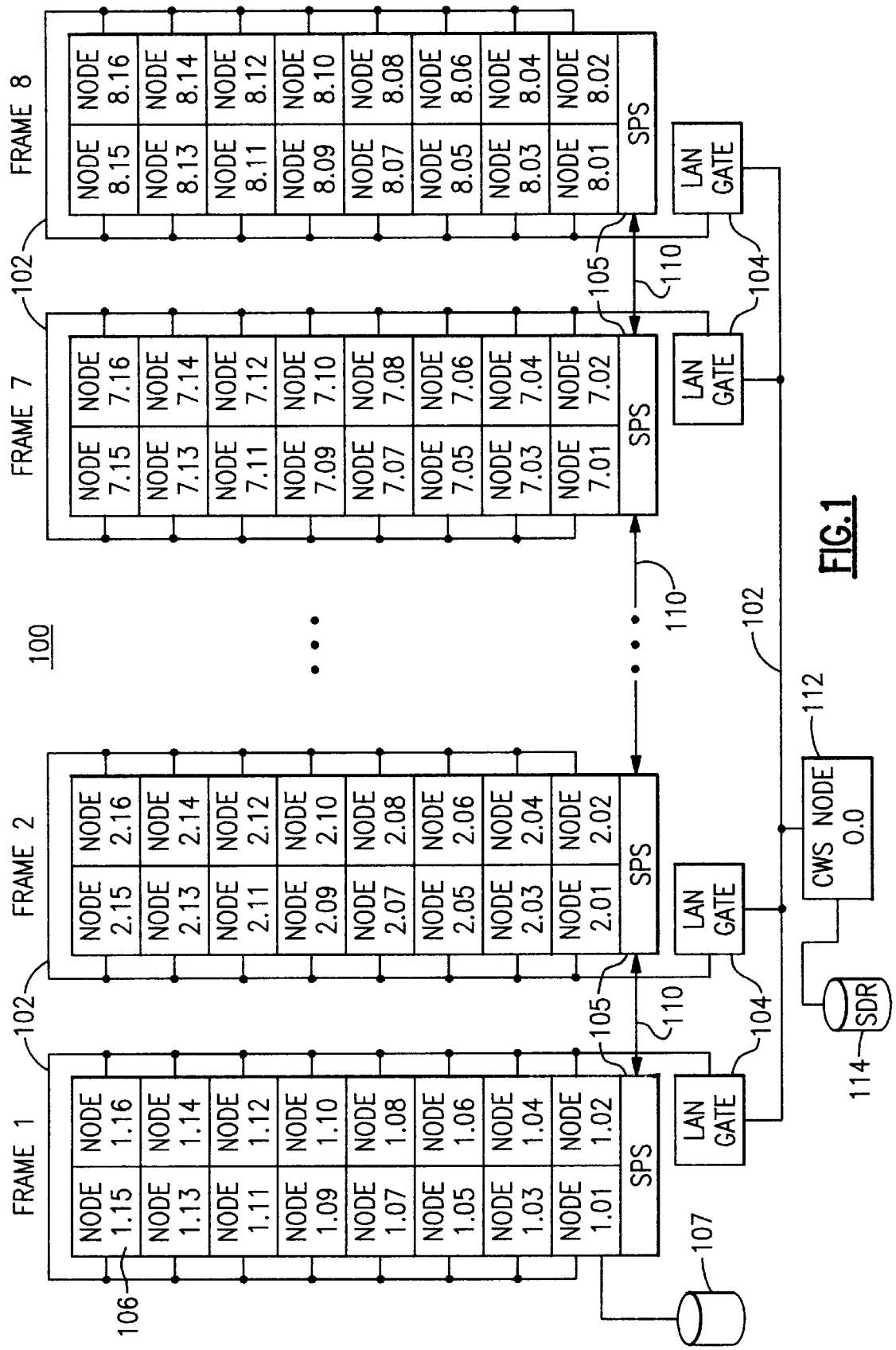
FIG. 1 is a block diagram of a distributed, parallel data processing system usable with the present invention.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 on which is stored the system data repository files (SDR). The SDR files include such information as a list of nodes that are in the system and their configuration. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As well understood in the art, the CWS node 112 sends system data and control signals to the frames of the SP computer 100 by means of the LAN 102 while messages and data may be sent from one to another of the nodes 106 by means of the high performance switches 105. Adapters (not shown) are placed between each node 106 and the SPS switch 105. One such adapter is shown in U.S. Pat. No. 5,448,558 to Gildea et al. for METHOD AND APPARATUS FOR MANAGING PACKET FIFOS issued Sep. 5, 1995, and owned by the assignee of the present application.

Figure 2:
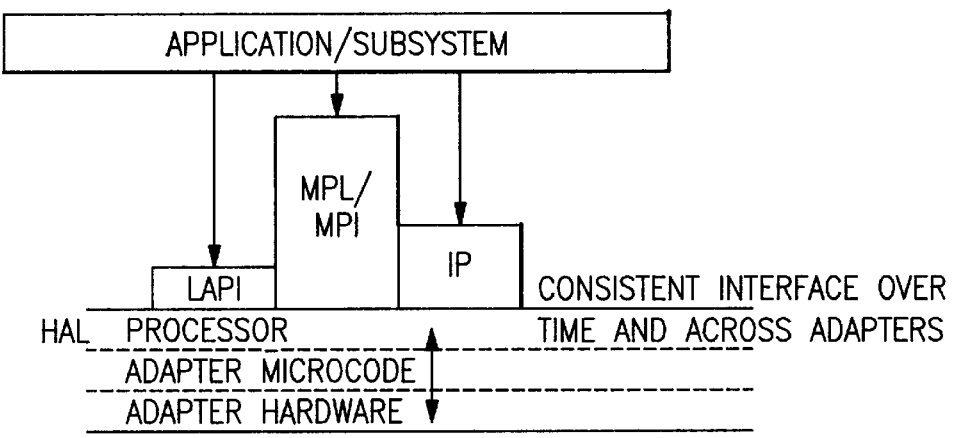
FIG. 2 is a block diagram showing the LAPI layer of the present invention in the operating system of each node of the system of FIG. 1.

The Low-level Applications Programming Interface (LAPI) of the present invention is a new communications API. As shown in FIG. 2, LAPI is a thin layer above the Hardware Abstraction Layer (HAL) interface and provides reliability through flow control (the HAL interface is disclosed in U.S. patent application Ser. No. 08/920,084 filed Aug. 26, 1997 for "HARDWARE INTERFACE BETWEEN A SWITCH ADAPTER AND A COMMUNICATIONS SUBSYSTEM IN A DATA PROCESSING SYSTEM by C. A. Bender et al. owned by the assignee of the present inventions still pending. LAPI uses a basic "Active Message Style" mechanism which provides a one-sided communications model. The library provides a relatively small set of fixed functions (e.g. LAPI_Get, LAPI_Put) and a general Active Message function which allows users to supply extensions by means of additions to the notification handlers.

Figure 3:
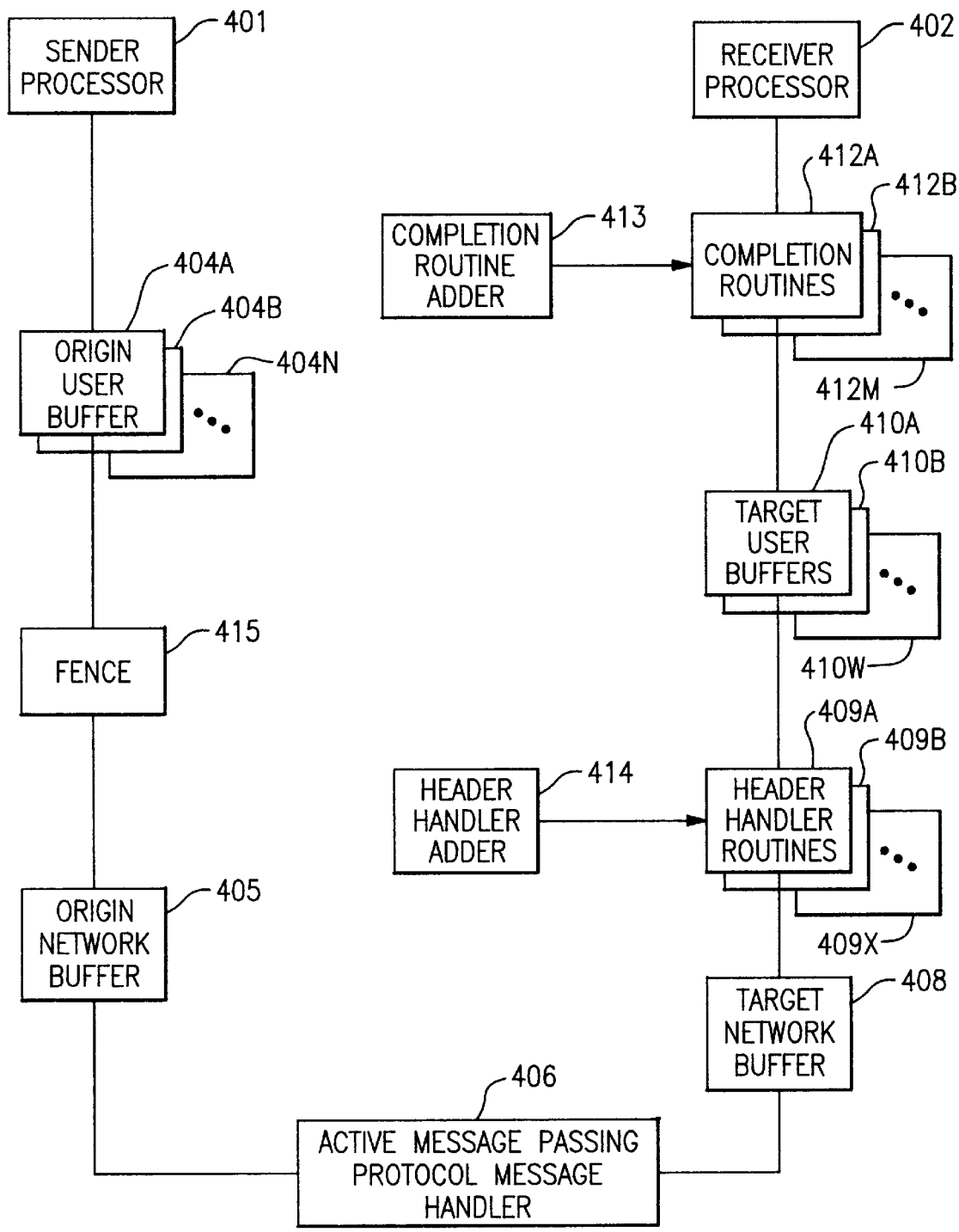
FIG. 3 is a block diagram showing the sending of messages from a sender processor to a receiver processor in the system of FIG. 1.

FIG. 3 is a block diagram illustrating the communication low-level application programming interface of the present invention. As shown in FIG. 3, the present embodiment includes a sender or source processor 401 and a receiver or target processor 402. The sender processor 401 is connected to sender or origin user buffers 404A to 404N from which user messages are sent. The sending of user messages from one or the origin user buffers 404A to 404N may be controlled, when present, by a fence 415, to be discussed. A copy of the user message is then packetized in a network buffer 405. An active message passing protocol message handler 406 transfers the user message in packets from the origin network buffer 405 to a receiver or target network buffer 408. LAPI is informed when a message is received in the receiver network buffer 408. LAPI then invokes one of the header handler routines 409A to 409X. The proper header handler routine 409A to 409X to be invoked is indicated in each packet of the message handler by, for instance, a name or address pointing to the location of the header handler routine. The header handler then indicates to LAPI which one of receiver or target user buffers 410A to 410W the user message data is to be stored in, and further indicates which of the completion routines 412A to 412M is to complete the transfer of the user message. LAPI then transfers the user message data from the target network buffer 408 to the indicated target user buffer 410. When the last user message packet is received, LAPI queues the indicated completion routine 412 in one of one or more completion handler queues which, when executed, completes the transfer. The target user buffer may be a null buffer when the message is a command or other message that does not require a target buffer. Similarly, the completion routine may be a null routine when the transfer is completed by the header handler.

The sender processor 401 and receiver processor 402 may each be, for instance, one of the nodes 106 of FIG. 1. It will be understood that messages may be transmitted in either direction between nodes. For example, a message may be sent from the sender 401 to the receiver 402. Also, however, a message may be sent from 402 to 401, in which case 402 becomes the sender and 401 is the receiver.

The completion routines may be tailored to be executed by the receiver processor 402. For instance, even though in the present embodiment, all of the work stations of the nodes 106 are typically the same, a system is envisioned in which the nodes may be different workstations, or even different data processing devices having differing operating systems. In that case, the completion routine is tailored for the particular processor and operating system present at the receiver, and may vary from node to node. Also, since different completion routines, which may be application programs for processing the message data, are present at the receiver, a routine 413 is provided to add to or increase the completion routines 412A to 412M at the receiver, as desired. Similarly, a header handler adder mechanism 414 is provided to add to or increase the header handler routines 409A to 409X at the receiver, as desired. As will be explained, part of the initialization routine for LAPI is to exchange addresses from the receiver to the sender.

In the present embodiment, the header handler indicates the completion routine, if any, which processes the message data. This may be done by including in the header handler, a name of the completion routine desired, an address where the completion routine may be found by the receiver processor, or other means, as is well known to those skilled in the art.

If more than one user message is consecutively transmitted from the sender 401 to the receiver 402, the user messages may arrive at the receiver 402 over the network in any order. A fence 414 may be included in the sender, and the user messages are divided into sets. The set being handled by the message handler 406 is indicated to the fence 414, such as by tokens. If a user message to be sent does not have the proper token, it is not sent until after all of the user messages in the present set have been transmitted and received. In this way, the user messages in the present set are transmitted and placed in the correct user buffer 410, regardless of the order in which the user messages are received.

All user messages are received in the network buffer 408. The receiver user messages may then be placed in one or more user buffers 410, and the user message data is processed by an indicated one of the completion routines at 412, as discussed. The network buffer 408, user buffers 410A to 410W and internal resources, to include completion handler queues, various tables, counters and buffering, may be referred to as receiver resources. If any of the receiver resources are unable to accommodate additional user messages, the sending of additional user messages must be suspended until the receiver resources are again able to handle more user messages. This is done by throttling.

LAPI solves the problem for the case where the rate at which completion routines 412 are started up may be faster than the rate at which they complete. In this situation any buffering (in internal resources) that is provided is bound to get filled. LAPI solves this problem by throttling the sender 401 of these messages. This is done by throttling the sender 401 to not send acknowledgments back for the last network packet of a message that requires a completion routine 412. Thus, the sender 401 cannot complete this message and will resend the unacknowledged packet. When the resent packet arrives, the receiver 402 will check if the required buffer space is now available. If there is available space, the completion routine 412 will be scheduled and the incoming packet acknowledged. If buffering space is still not available, the packet is again ignored (i.e. an acknowledgement is not sent). Thus, the recovery mechanism is used to solve the buffering problem of the completion handler queue.

It will be understood that the acknowledgment (which is an internal message used to control message passing) is sent outside of the critical path of the message passing operation. The user message transmission process, from the start of sending a user message from the sender to the receiver, the receipt of the user message in the network buffer 408, and the placing of the user message in a user buffer 410 by the header handler, has priority over the transmission of internal messages such that user messages do not have to wait for the transmission of internal messages.

Since the processor 402 may also act as a sender to send user messages to the processor 401, if a user message is to be sent to processor 401, and an internal message also has to be sent from processor 402 to 401, some of the internal message may be included with, or "piggybacked", with user messages to reduce the number of messages being sent from node to node.

Since the handling of internal messages causes an interrupt which is disruptive to the operation of the processors of the nodes, the present invention provides a mechanism to increase the number of internal messages that may be handled by a single interrupt. When the sender generates an operation by sending a message, the sender will know how many internal messages will be returned as a result of the operation being generated. Thus, the sender sets a threshold for the message handler 406 which does not raise an interrupt until the expected number of internal messages have been returned. In this way, the number of interrupts are reduced, and a number of internal messages may be handled by a single interrupt.

The present invention uses counters to signal the events associated with the nonblocking communication calls. The specified counter is incremented whenever the event associated with the counter occurs. By checking the value of the counter the user can determine if the event (associated with the counter by the user) in question has occurred.

In the present invention, interfaces that involve nonblocking communication take in as parameters different counters to signal events associated with the communication call in question. The counter structure is defined, and the user is expected to access the counter only using the defined interfaces. However, the user specifies the counters and the relationship of a counter to a message/event. The user may use the same counter across multiple messages. This gives the user the freedom to group different communication calls with the same counter and check their completion as a group.

A library is provided which updates the user specified counters when a particular event (or one of the events) with which the counter was associated has occurred. The user can check on the status of a particular event by polling on the value of the appropriate counter; this polling is done using a LAPI specified interface. Alternatively, the user registers a handler associated with the counter which will be invoked when the counter is incremented or reaches a specified value. If a user wants to wait on a particular event rather than check if it has occurred, LAPI provides an interface to wait on the counter until the counter reaches the specified value. This is a blocking interface. If the user waits for the counter to reach a specific value, then when LAPI returns from the wait, the counter value is decremented by the value (which indicates the number of events) specified in the wait. The same counter may be associated with multiple messages.

By providing the counter solution, a single interface representing the MPI standard and synchronous calls are provided. However, the ability to specify different types of nonblocking behavior is still maintained. The user can simulate either standard or synchronous behavior by specifying appropriate counters and waiting on them at the appropriate places in the code. And the user can mix the use as needed by the application making this more flexible.

Figure 4:
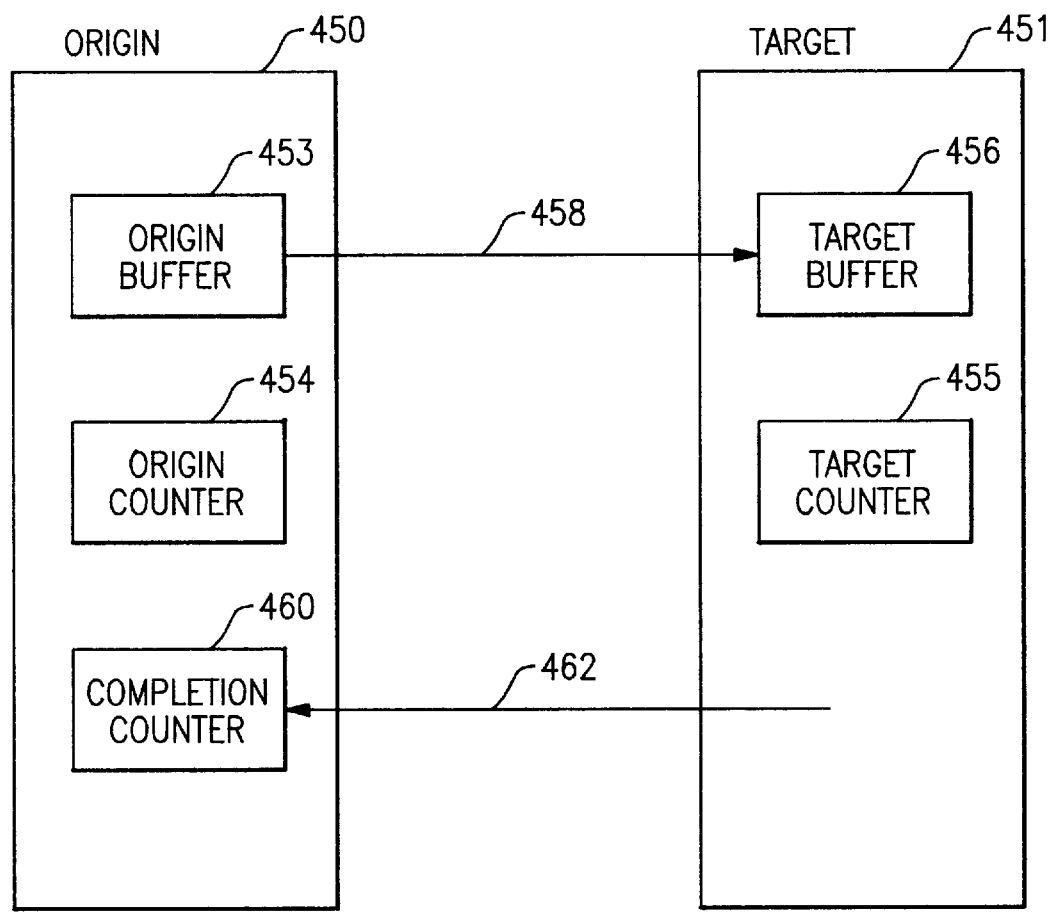
FIG. 4 is a block diagram showing the use of counters associated with buffers of FIG. 3 for monitoring communication events in the system of FIGS. 1 and 3.

FIG. 4 is a block diagram showing an origin 450 and target 451 in a communication system. The origin 450 of FIG. 4 may be the same as the sender 401 of FIG. 3, and the target 451 of FIG. 4 may be the same as the receiver 402 of FIG. 3. A plurality of counters is provided in both the origin 450 and the target 451. These counters may be associated by the user with desired communication events such that the user may monitor the communication events by watching the number in the counters. For instance, one of the counters (shown in FIG. 4 as origin counter 454) may by associated with an origin buffer 453. Another of the counters 455 may be associated with a target buffer 456. The origin buffer 453 may be one of the origin user buffers 404 of FIG. 3, and the target buffer 456 may be one of the target user buffers 412 of FIG. 3. The communication event to be monitored may be sending a message from origin buffer 453 to the target 456, as shown by the arrow 458. Thus, each time a message is sent from origin buffer 453, the origin counter 454 is incremented, and each time a message is received at target 456, the target buffer 456 is incremented. Thus, each time the origin counter 454 is incremented, the user knows, for instance, that the origin buffer 453 is available. Similarly, each time the target counter 455 is incremented, the user knows that the operation on the target buffer 456 by LAPI has been completed.

It will be understood that a number of messages may be grouped together, if desired, and an associated counter may be monitored to determine if the entire group of messages has been transmitted.

A counter 460 may also be defined as a completion counter by the user. When the user message has been completed (as described herein) at the target 451 by the receiver, the target 451 sends a completion message to the origin 450 indicating the message is complete, as shown at 462. As is described, the completion message 462 instructs the completion counter 460 to be incremented. When the completion counter 460 is thus incremented, the origin 450 knows that the message 458 is completed. The completion counter 460 may be used to insure a first message is completed before a second message is transmitted. It will be understood that messages may be delivered in any order. It may be important that a first message be completed before a second message is started. However, the second message may arrive first over the network. In the present embodiment, a user at the origin may send a first message, as shown an 458, and then monitor the completion counter 460. When the completion counter 460 is incremented, the user knows that the first message was completed, and may then issue the second message. This is particularly useful where many messages are being sent, but the order of completion is important for only a few. The order of the desired messages may be assured while allowing those other messages whose order is not important be communicated without delay.

The LAPI is a non-standard application programming interface designed to provide optimal communication performance on the SP Switch. It is based on an "active message style" programming mechanism that provides a one-sided communications model (that is, one process initiates an operation and the completion of that operation does not require any other process to take a complementary action). The LAPI library provides PUT and GET function and a general "active message" function that allows programmers to supply extensions by means of additions to the notification handlers. The LAPI is designed for use by libraries and power programmers for whom performance is more important than code portability.

The LAPI provides the following advantages:

Performance—The LAPI provides basic function for optimal performance. It is designed to especially provide low latency on short messages.

Flexibility—The LAPI's one-sided communications model provides flexibility because the completion of an operation by one process does not require any other process to take a complementary action. Also, the LAPI provides a more primitive interface (than either the MPI or IP) to the SP Switch, giving the programmer the choice of how much additional communications protocol needs to be added.

Extendibility—The LAPI supports programmer-defined handlers that are invoked when a message arrives. Programmers can customize the LAPI to their specific environments.

General characteristics provided by LAPI are:

Reliability—The LAPI provides guaranteed delivery of messages. Errors not directly related to the application are not propagated back to the application.

Flow control

Support for large messages

Non-blocking calls

Interrupt and polling modes

Efficient exploitation of switch function

By default, ordering is not guaranteed

General LAPI Functions

LAPI functions are divided into three parts:

1. A basic "active message" infrastructure that allows programmers to install a set of handlers that are invoked and executed in the address space of a target process on behalf of the process originating the active message. This generic interface allows programmers to customize the LAPI function to their unique environment.

2. A set of defined functions that is complete enough to satisfy the requirements of most programmers. These defined functions make the LAPI more usable and at the same time lend themselves to efficient implementation because their syntax and semantics are known.

3. A set of control functions for the initialization and eventual orderly shutdown of the LAPI layer.

Understanding the LAPI

To help you achieve a fuller understanding of the LAPI, this section presents further details on the "active message" infrastructure and the defined set of functions. In addition, concepts important to understanding the LAPI are explained.

The "Active Message" Infrastructure

"Active message" was selected as the underlying infrastructure for the LAPI. The "active message" infrastructure has the following characteristics:

The "active message" includes the address of a user-specified handler. When the active message arrives at the target process, the specified handler is invoked and executes in the address space of the target process.

The "active message" optionally may also bring with it the user header and data from the originating process.

Operations are unilateral in the sense that the target process does not have to take explicit action for the active message to complete.

Storage buffers for arriving data need to be provided by the invoked handler.

Writing Handlers

The ability for programmers to write their own handlers provides a generalized, yet efficient, mechanism for customizing the interface to one's specific requirements. The user is responsible for protecting shared structures and buffers where necessary by using the locking structures available in the AIX (the IBM version of the UNIX operating system) p-threads library.

The LAPI supports messages that can be larger than the size supported by the underlying SP Switch subsystem. Therefore, the data sent with the "active message" may arrive at the target in multiple packets and, further, these packets can arrive out of order. This situation places some requirements on how the handler is written.

When the "active message" brings with it data from the originating process, the architecture requires that the handler be written as two separate routines:

1. A "header handler" function. This function is specified in the "active message" call. It is called when the message first arrives at the target process and provides the LAPI dispatcher (the part of the LAPI that deals with the arrival of messages and invocation of handlers) with an address where the arriving data must be copied, the address of the optional "completion handler," and a pointer to the parameter that will be passed to the "completion handler".

2. A "completion handler" that is called after the whole message has been received.

An Example of LAPI "Active Message" Function

In this example, a programmer writes a handler for the LAPI "active message" interface. Refer to IBM Parallel System Support Programs for AIX: Command and Technical Reference for more information on the LAPI_Amsend subroutine.

1. The desired function (accumulate) is to add vector (S) to another (D) on the target node and put the results in the vector at the target:

$$D[0 \ldots N-1]=D[0 \ldots N-1]+S[0 \ldots N-1]$$

where,
S[N] is a vector of length N in the address space of the origin process (origin_process)
  D[N] is a vector of length N in the address space of the target process (target_process)
2. The generic "active message" call is defined as LAPI_Amsend (hndl, tgt, hdr_hdl, uhdr, uhdr_len, udata, udata_len, tgt_cntr, org_cntr, cmpl_cntr)

3. Before making the active message call, you must obtain the address of the target counter (target_cntr_addr) and the address of the header handler to be executed on the target process (accumulate_addr). The address of the header handler is obtained by the LAPI_Address_init function.

4. Initialize the udhr based on the header expected by accumulate. For example, the structure of udhr could be:

```
typedef struct {
    void target_addr;
    uint length;
} put_add_hdr_t;
put_add_hdr_t uhdr;
uhdr.target_addr = D;
uhdr.length = N;
```

5. Make the specific call

```
LAPI_Amsend (hndl, target_process, accumulate_addr,
    &uhdr, sizeof(put_add_hdr_t), &S[0],
    N sizeof(S[3]), target_cntr_addr, &origin_cntr,
    &completion_cntr)
```

6. When this message is received at the target (assuming that the entire origin data is contained within a packet), the accumulate handler you specified is invoked by the dispatcher. The structure of the header handler is:

```
void header_handler (lapi_handle_t hndl, void uhdr,
    uint uhdr_len, uint msg_len,
    completion_handler_t,
        completion_handler, void user_info)
```

The structure of the completion handler is:

```
void completion_handler (lapi_handle_t hndl,
    void user_info)
```

7. If any state information about the message is required by the completion handler, the information required must be saved in a user buffer by the header handler. The header handler passes the address of this buffer to the dispatcher through the parameter user info. The dispatcher uses this pointer as a parameter (user_info) for the completion handler.

8. For this example operations performed at the target process are:

Within the dispatcher:

a. The LAPI header is read.
b. uhdr and uhdr_len are extracted from the LAPI header.
c. The header handler is invoked.

```
buf = ( accumulate_addr)(hndl, uhdr, uhdr_len, msg_len,
    &completion_handler, &user_info);
``` d. udata is copied into buf.
e. The completion handler is invoked.

```
( completion_handler)(&hndl, user_info);
```

Note: If the message was not contained within a packet, the LAPI layer will save the necessary information and will invoke the completion handler after all the udata has arrived and copied into buf User defined functions:
Header handler:

```
accumulate(hndl, uhdr, uhdr_len, msg_len, completion
handler,
{
    buf = addr where incoming data should be
buffered
    save (target_addr=D, length=N, buf) in user_info
    completion_handler = complete_accumulate
    return buf
}
```

Completion handler:

```
complete_accumulate (hndl, user_info)
{
    retrieve required data (namely D,N and buf) from
user_info;
    for (i=0; i<N; i++) D[i]=D[i]
        + buf [i];
    return
}
```

The accumulate handler is the header handler and is called by the LAPI layer when the message first arrives at the target process. The header handler saves the information required by complete_accumulate (target—addr, length, and buf) in user_info and passes back a pointer to the complete_accumulate handler as user_info. Additionally, the header handler returns address of a buffer buf.

Large active messages are generally transferred as multiple packets. In this case the LAPI layer stores the incoming data in the packets as they arrive into buf. When all the data has been received, it calls the complete_accumulate function which uses user_info to access the two vectors, adds them and stores them at the desired location. After the return from the complete_accumulate routine, the LAPI layer increments tgt_ctr. The origin_cntr is incremented when it is safe to return the origin buffer back to the user.

The cmpl_cntr is incremented after the completion handler has completed execution. The cmpl_cntr, therefore, is a reflection, at the origin, of the tgt_cntr.

The Defined Set of Functions

Fundamentally, the defined set of functions for the LAPI provides a Remote Memory Copy (RMC) interface. The primary characteristics of the defined set of functions provided by LAPI are:

The basic data transfer operations are memory to memory copy operations that transfer data from one virtual address space to another virtual address space.

The operations are unilateral. That is, one process initiates an operation and the completion of the operation does not require any other process to take some complementary action. (This is unlike a send and receive operation, where a send requires a complementary receive with matching parameters to be posted for completion.)

The operations support both "pull" and "push". The LAPI_Get operation copies data from the address space of the target process into the address space of the origin process. The LAPI_Put operation copies data into the address space of the target process from the address space of the origin process.

The initiating process specifies the virtual address of both the source and destination of the data (unlike a send and receive process where each side specifies the address in its own address space). To avoid the limitation of requiring that the address maps on the different processes be identical, the LAPI provides the LAPI_Address_init mechanism by which the different communicating processes can exchange information regarding the address map of shared data objects.

Because data transfer operations are unilateral and no synchronization between the two processes is implied, additional primitives are provided for explicit process synchronization when it is necessary for program correctness.

Functions are provided to detect completion and to enforce ordering.

Important LAPI Concepts

To use the LAPI, it is important to understand the following concepts:

Origin and target
   Blocking and non-blocking calls
   Completion of communication operation
   Message ordering and atomicity
   Error handling
   Progress Origin and Target "Origin" denotes the task (or process or processor) that initiates a LAPI operation (PUT, GET, or "active message".). "Target" denotes the other task whose address space is accessed. Although multiple tasks may run on a single node, it is convenient to think of each task as running on a different node. Therefore the origin task may also be referred to as the "origin node" and the target task as the "target node". The origin and target can be the same for any of the calls, but if the origin and target data areas overlap, the results are undefined.

Blocking and Non-Blocking Calls

A blocking procedure is one that returns only after the operation is complete. There are no restrictions on the reuse of user resources.

A non-blocking procedure is one that may return before the operation is complete and before the user is allowed to reuse all the resources specified in the call. A non-blocking operation is considered to be complete only after a completion testing function, such as LAPI_Waitcntr or LAPI_Getcntr, indicates that the operation is complete.

Completion of Communication Operation

A communication operation is considered to be complete, with respect to the buffer, when the buffer is reusable.

A PUT is complete with respect to the origin buffer when the data has been copied out of the buffer at the origin and may be overwritten. A GET is complete with respect to the origin buffer when that origin buffer holds the new data that was obtained by GET.

A PUT is complete with respect to the target buffer when the new data is available at the target buffer. A GET is complete with respect to the target buffer when the data has been copied out of the buffer at target and the target task may overwrite that buffer.

Communication Behaviors: Two communication behaviors support two different definitions of "completion":

In standard behavior, a communication operation is defined as complete at the origin task when it is complete with respect to the origin buffer; it is complete at the target task when it is complete with respect to the target buffer.

In synchronous behavior, a communication operation is defined as complete at the origin task when it is complete with respect to both the origin buffer and target buffer. It is complete at the target task when it is complete with respect to the target buffer.

The LAPI defines both standard and synchronous behaviors for PUT operations. The LAPI defines only synchronous behavior for GET operations.

Message Ordering and Atomicity

Two LAPI operations that have the same origin task are considered to be ordered with respect to the origin if one of the operations starts after the other has completed at the origin task. Similarly, two LAPI operations that have the same target task are considered to be ordered with respect to the target if one of the operations starts after the other has completed at the target task. If two operations are not ordered, they are considered concurrent. The LAPI provides no guarantees of ordering for concurrent communication operations. The LAPI does provide mechanisms which an application can use to guarantee order.

As an example, consider the case where a node issues two standard behavior PUT operations to the same target node, where the targets overlap. These two operations may complete in any order, including the possibility of the first PUT overlapping the second, in time. The contents of the overlapping region will be undefined, even after both PUTs complete. Using synchronous behavior for both PUT operations, (waiting for the first to complete before starting the second) will ensure that the overlapping region contains the result of the second after both PUTs have completed.

Error Handling

If an error occurs during a communications operation, the error may be signaled at the origin of operation, or the target or both. Some errors may be caught before the communication operation begins, and these will be signaled at the origin. However, some errors will not occur until the communication is in progress (a segmentation violation at the target, for example); these may be signaled at either or both ends of the communication.

Progress

All LAPI operations are unilateral by default and can complete successfully or fail, independent of the actions of other tasks. Specifically, a LAPI operation to a particular target should complete even if the target is stuck in an infinite loop (that is, when the target process is in interrupt mode).

Using the LAPI

In general, LAPI functions:

Are non-blocking calls
   Provide both polling and interrupt mode
   Signal completion by incrementing counters at each end
   Provide both C and Fortran bindings
   Complementary functions provide for checking completion of operations and for enforcing relative ordering if required. Additionally, functions allow processes to exchange addresses that will be used in LAPI operations.

Specific LAPI Functions

The LAPI provides the following specific functions.

Active Message Active message function (LAPI_Amsend) is a non-blocking call that causes the specified active message handler to be invoked and executed in the address space of the target process. Completion of the operation is signaled if counters are specified. Both standard and synchronous behaviors are supported. The LAPI_Amsend function provides two counters (org_cntr and cmpl_cntr) which can be used to provide the two behaviors. The org_cntr is incremented when the origin buffer can be reused (standard). The cmpl_cntr is incremented after the completion handler has completed execution (synchronous).

Data Transfer

Data transfer functions are non-blocking calls that cause data to be copied from a specified region in the origin address space to the specified region in the target address space (in the case of a LAPI_Put operation) or from a specified region in the target address space to a specified region in the origin address space (in the case of a LAPI_Get operation). Completion of the operation is signaled if counters are specified. Both standard and synchronous operations are supported for PUT. Only synchronous operation is possible in the case of GET. Standard PUT is provided by incrementing the org_cntr when the origin buffer can be reused. Synchronous PUT is provided by incrementing the cmpl_cntr after the data has been written into the target buffer. The LAPI_Getcntr (or LAPI_Waitcntr) function should be used in conjunction with the org_cntr and cmpl_cntr counters to guarantee the respective standard and synchronous behavior of the LAPI PUT operations.

Synchronizing

The LAPI_Rmw function is used to synchronize two independent operations such as two processes sharing a common data structure. The operation is performed at the target process and is atomic. The operation takes a variable from the origin and performs one of four selected operations on a variable from the target and replaces the target variable with the results of the operation. The original value of the target variable is returned to the origin. LAPI_Rmw provides four different read/modify/write (rmw) operations:

SWAP

COMPARE_AND_SWAP

FETCH_AND_ADD

FETCH_AND_OR

Completion is signaled at the origin if the counter is specified.

Completion Checking

The following counter functions provide the means for a process to manage the completion state of the LAPI operations.

LAPI_Waitcntr—Wait on a counter to reach a specified value and return when the counter is equal to or greater than that value (blocking)

LAPI_Getcntr—Get the current value of a specified counter (non-blocking)

LAPI_Setcntr—Set the counter to a specified value

These functions also provide an efficient means to order the flow of LAPI operations or the use of certain user managed resources (for example, buffers). For example, a series of PUTs to a single target and buffer requires that the contents of the buffer at the target remains in step with the order of execution of the PUTs at the origin. Using the cmpl_cntr counter in the LAPI_Put function in conjunction with the LAPI_Waitcntr function provides the necessary ordering.

Ordering

LAPI_Fence and LAPI_Gfence operations provide a means to enforce the order of execution of LAPI functions. LAPI functions initiated prior to these fencing operations are guaranteed to complete before LAPI functions initiated after the fencing functions. LAPI_Fence is a local operation which is used to guarantee that all LAPI operations initiated by the local process and the same process thread are complete. LAPI_Gfence is a collective operation involving all processes in the parallel program. LAPI_Gfence provides a barrier operation for the parallel program. Both LAPI_Fence and LAPI_Gfence operations are a data fence that guarantee that the data movement is complete. These are not an operation fence which would need to include "active message" completion handlers completing at the target.

Progress

The LAPI_Probe function is used in polling mode to transfer control to the communication subsystem in order to make progress on arriving messages.

Address Manipulation

The LAPI_Address_init collective operation allows processes to exchange operand addresses of interest. Such function is required if the processes do not have identical address maps. The LAPI_Address is used by Fortran programs when an address needs to be stored in an array. In Fortran there is no concept of "address" (as there is in the C language) and this function gives that ability to Fortran.

LAPI Setup

LAPI_Init and LAPI_Term operations are used to initialize and terminate the communication structures required to effect LAPI communications for a specific instance of LAPI. LAPI_Init returns a unique handle which is used to associate a communication channel with the LAPI instance. This handle is subsequently passed as a parameter to each of the other LAPI functions. The LAPI_Term function is used to terminate a specific instance of LAPI.

Error Handling and Messages

The LAPI_Init function provides a means for the user of LAPI to register an error handler. This error handler is specified as part of the lapi_info structure parameter which is passed to the LAPI_Init function. The LAPI_Msg_String function provides the means to translate a LAPI call return code value (integer) into a message string.

LAPI Environment

The LAPI_Qenv function is used to query the state of the LAPI communications subsystem. The LAPI_Senv function allows the programmer to specify the value of some of the LAPI communications subsystem's environment variables. An important value that can be specified is the interrupt state. The interrupt state is set by specifying INTERRUPT_SET as on (for interrupt mode) or off (for polling mode). The default setting for INTERRUPT_SET is on.

The LAPI Execution Model

The goal of LAPI is to provide a threads-safe environment and support an execution model that allows for maximum execution concurrency within the LAPI library.

Using the setup function (LAPI_Init), a user process establishes a LAPI context. Within a LAPI context, the LAPI library is threads-safe, and multiple threads may make LAPI calls within the same context. The different calls may execute concurrently with each other and with the user threads. However, in reality execution concurrency among these calls is limited by the locking required with LAPI to maintain integrity of its internal data structures and the need to share a single underlying communication channel.

As with any multi-threaded application, coherence of user data is the responsibility of the user. Specifically, if two or more LAPI calls from different threads can execute concurrently and if they specify overlapping user buffer areas, then the result is undefined. It is the responsibility of the user to coordinate the required synchronization between threads that operate on overlapping buffers.

The user application thread, as well as the completion handlers, cannot hold mutual exclusion resources before making LAPI calls; if they do, it is possible to run into deadlock situations.

Because user-defined handlers may be called concurrently from multiple threads, it is the user's responsibility to make them threads-safe.

Figure 5:
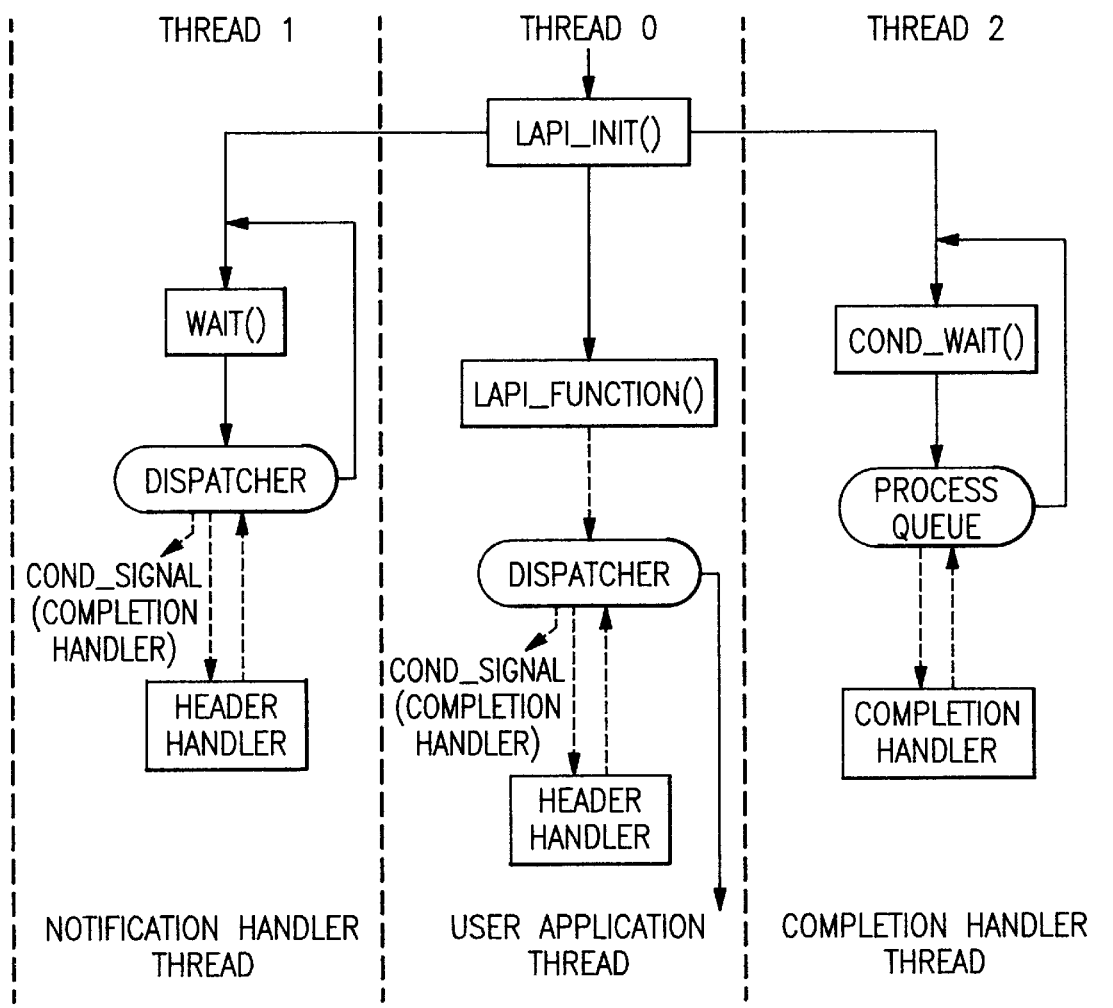
FIG. 5 is thread model showing the creation of a second thread from the user application thread to process notification events and invoke the LAPI handlers of the present invention.

From the user application thread a second thread is created by LAPI_Init to process notification events and invoke the LAPI handlers as illustrated in FIG. 5.

The application thread, notification thread and the completion handler thread are shown in FIG. 5.

Threads 0 and 1 (the application thread and the notification thread) attempt to invoke the LAPI dispatcher whenever possible; in this way, progress on incoming and outgoing messages can be made while minimizing additional overhead. Most LAPI calls (though not all) made by the application thread also result in the LAPI dispatcher being automatically run. The notification thread waits in the Kernel for the occurrence of a notification event. When an event occurs, the Kernel wakes up the waiting thread. As shown in FIG. 5, after the notification thread returns from waiting in the Kernel, it invokes the LAPI dispatcher.

The LAPI Dispatcher is the central control point that orchestrates the invocation of functions and threads necessary to process outstanding incoming and outgoing LAPI messages.

The LAPI Dispatcher can run from the application's user's thread, from the notification thread or from the completion handler thread. Locking is used to ensure that only one instance of the dispatcher runs at a time to maintain integrity. On incoming messages, the LAPI dispatcher manages the reassembly of data from different packets (which may arrive out-of-order) into the specified buffer, and then invokes the completion handler if necessary.

Thread 2 is created by LAPI_Init to execute completion handlers associated with "active messages". Completion handlers are written by users and may make LAPI function calls which in turn will invoke the LAPI Dispatcher. The completion handler thread processes work from the completion handler queue. When the queue is empty the thread waits using a pthread_cond_wait( ). If an active message (LAPI_Amsend) includes a completion handler, the dispatcher queues a request on the completion queue after the whole message has arrived and has been reassembled in the specified buffer; the dispatcher then sends a pthread_cond_ signal to the completion handler thread. If this thread was in a wait state it will begin processing the completion handler queue, otherwise, if it was not waiting, the thread signal is ignored.

LAPI handlers are not guaranteed to execute one at a time. It is important to note, however, that LAPI calls may execute concurrently with the origin or target or both. The same restrictions stated previously about not holding on to mutual exclusion resources when making LAPI calls still applies.

This discussion of a threads-safe environment and maximum execution concurrency within the LAPI library applies to both the polling and interrupt modes. In polling mode any calls to the communication library attempt to make progress on the context specified in the call. Further, the function LAPI_Probe is provided to allow applications to explicitly check for and handle incoming messages.

The execution model of the handlers consists of the following events:

Event Action

Message Arrival
  Copies the message from the network into the appropriate data access memory space.

Interrupt/Poll
  Causes an interrupt if required, based on the mode.

Dispatcher Start
  Invokes the dispatcher.

New Message Packet
  Checks the LAPI header and determines (by checking the receive state message reassembly table) if the packet is part of a pending message or if it is a new message. Calls the header-handler function.

Return from Header-Handler
  If the message is contained in more than one packet, the LAPI Dispatcher will log that there is a pending message, save the completion handler address, and save the user's buffer address to be used during the message reassembly of pending message packets.

Pending Message Packet
  Copies the message to the appropriate portion of the user buffer specified through the header-handler. If the packet completes the message, the dispatcher queues the completion handler; otherwise the dispatcher returns to check for message arrivals.

Completion Handler
  When the completion handler is executed, (after the return from the completion handler) updates the appropriate target counter before continuing.

Allocating Buffers
  1. The user allocates as many buffers per origin as wanted.
     Rule: At origin, if the target buffer allocation is exhausted, wait for the counter of previous requests.
     Example: Use>=P buffers (one per origin). At origin with one request pending. Wait on counter before issuing next request.
  2. If the header handler blocks, no further progress is made, including messages pending (that is, the communications adapter is stalled).

When the order of execution between any two LAPI functions within one task of a parallel program needs to be guaranteed, using LAPI_Waitcntr between the two LAPI functions will usually be more efficient than LAPI_Fence. LAPI_Fence requires that all LAPI operations initiated on the current thread before the LAPI_Fence be completed before any LAPI operation after the fence is allowed to start. LAPI_Waitcntr can be used to indicate the completion of a single LAPI function which had been initiated on the current thread before the LAPI_Waitcntr.

The scope of LAPI_Fence is per thread. For example, a LAPI_Fence which is issued from the completion handler thread will only guarantee that no LAPI operations initiated after the fence (on the completion handler thread) will start until all LAPI operations initiated before the fence have completed. In this case there are no guarantees about the order of LAPI operations initiated from the main application thread.

LAPI_Waitcntr can be used to indicate the completion of a single LAPI function which may have been initiated from an alternate thread (completion handler) within the same task. Therefore the possibility exists to use LAPI_Waitcntr to wait for the completion of another LAPI function which is initiated after the call to LAPI_Waitcntr.

LAPI_Waitcntr can be used to guarantee order of execution of LAPI_Amsend operations which are initiated from a single origin task. When LAPI_Amsend operations use the cmpl_cntr counter, this counter is incremented after the completion counter (or header handler if a completion handler is not specified) has executed at the target task. LAPI_Fence and LAPI_Gfence do not provide an indication that LAPI_Amsend operations have completed execution at the target.

LAPI_Waitcntr is a blocking call. If a user prefers to avoid this blocking operation a program loop comprised of the sequence LAPI_Getcntr a check of the value returned from Get LAPI_Probe will provide an equivalent logical operation and provide the user with added flexibility.

LAPI_Init must be called before any thread (the main thread or the completion handler thread) can make a LAPI call. In addition to this, LAPI_Address_init or LAPI_Gfence should be the second LAPI call. These two functions provide a barrier which guarantees that all other LAPI tasks have initialized their LAPI subsystems and are ready to receive requests from remote tasks. Failure to provide these barrier functions may result in dropped switch packets, low performance at start-up and unnecessary switch congestion. The instance of the LAPI subsystem should be quiesced before LAPI_Term is called to terminate the LAPI instance. This can be done by calling LAPI_Gfence before LAPI_Term.

LAPI Programming Example

Active Message (C)

This C program is an example of the use of the LAPI active message call:

```
/*
** Example Program illustrating use of the LAPI Active
** Message Call
*/
#include <pthread.h>
#include <lapi.h>
#define A_MAX  2
#define I_MAX  10
typedef_struct   { /* header for active message handler*/
       compl_hndlr_t *cmpl_hndlr; /*   pointer to completion
                                       handler */
       int        uinfo; /* uinfo passed to - - */
} usrhdr_t;            /* the completion handler */
volatile int cont=0;
/*
** Function:     The completion handler for the active call.
**               This is invoked at the target after all the
**               data of the active message send
**               (LAPI_Amsend) call have reached the target.
** Parameters:   hndl    -> pointer to the handle for the
**                          LAPI context
**               param   -> pointer to the user param
**                          (specified by user in the
**                          header handler function)
*/
void
do_get(lapi_handle_t *hndl, void *param)
{
       int loop, rc;
       int *buf;
       buf = (int *) param;
       printf("In Completion Handler: Result of AM call\n");
       /* Print Updated buffer */
       for (loop=0; loop < I_MAX; loop++) {
               printf("val[%d] = %d\n", loop, buf[loop]);
       }
       cont= 1;
}
/*
** Function:     User's active message header handler.
**               This is invoked at the target when the
**               active message first arrives at the target
** Parameters:   hndl      -> pointer to the handle for the
**                            LAPI context
**               uhdr      -> pointer to the user header
**               uhdrlen   -> pointer to the length of the
**                            user header
**               msglen    -> pointer to the length of the
**                            message
**               compl_hndlr -> pointer to the completion
**                            handler function pointer.
**                            This is be set by the user
**                            in this function
**                            (CAN be NULL)
**               saved_info -> pointer to the user_info.
**                            This is set by the user
**                            in this function. This
**                            parameter is then passed to
**                            the completion handler when
**                            the completion handler
**                            is invoked.
*/
void *
hdr_hndlr(lapi_handle_t *hndl, void *uhdr, uint *uhdrlen,
          uint *msglen, compl_hndlr_t **cmpl_hndlr,
          void **saved_info)
{
       void       *buf;
       usrhdr_t   *vhdr;
       printf("In Header Handler\n");
       vhdr          = (usrhdr_t *) uhdr;
       *cmpl_hndlr   = (compl_hndlr_t *) vhdr->cmpl_hndlr;
       *saved_info   = (void *) vhdr->uinfo;
       buf           = (void *) vhdr->uinfo;
       return (buf);
}
int
main(int argc, char **argv)
{
       lapi_handle_t _hndl; /* LAPI context hndl - returned */
       lapi_info_t _info; /* LAPI info structure */
       int           task_id, /* My task id */
                     num_tasks; /* Number of tasks in my job */
       lapi_cntr_t   l_cntr; /* Origin counter */
       lapi_cntr_t   _cntr; /* Target counter */
       lapi_cntr_t   c_cntr; /* Completion counter */
       int           t_buf[I_MAX]; /* Buffer to manipulate */
       void          *global_addr[A_MAX]; /* Array to store */
                            /* t_buf addr from all the tasks. */
                            /* The size of this array needs */
                            /* to each number of tasks */
       void   *tgt_addr[A_MAX]; /* Array to store target */
                            /* counter addr from all the tasks. */
       void   *hndlr_addr[A_MAX]; /* Array to store */
                            /* header handlers */
       void   *cmpl_hndlr_addr[A_MAX]; /* Address of */
                            /* completion handler */
       usrhdr_t _uhdr;    /* Store Header Handler information */
       void        *uhdr, *udata;
       int         uhdrlen, udatalen;
       int         loop, rc, tgt, val, cur_val;
       char        err_msg_buf[LAPI_MAX_ERR_STRING];
       t_info.err_hndlr = NULL;  /* Not registering error */
                           /* handler function */
       if ((rc = LAPI_Init(&t_hndl, &t_info))!=LAPI_SUCCESS) {
               LAPI_Msg_string(rc, err_msg_buf);
```

```
            printf("Error Message: %s, rc = %d\n",
                    err_msg_buf, rc);
            exit (rc);
    }
            /* Get task id within job */
    rc = LAPI_Qenv(t_hndl, TASK_ID, &task_id);
            /* Get no. of tasks in job */
    rc = LAPI_Qenv(t_hndl, NUM_TASKS, &num_tasks);
    if (num_tasks != 2) {
            printf("Error Message: Program should run"
                    "on 2 nodes\n");
            exit(1);
    }
/* Turn off parameter checking - default is on */
rc = LAPI_Senv(t_hndl, ERROR_CHK, 0);
/* Initialize counters to be zero at the start */
rc = LAPI_Setcntr(t_hndl, &l_cntr, 0);
rc = LAPI_Setcntr(t_hndl, &t_cntr, 0);
rc = LAPI_Setcntr(t_hndl, &c_cntr, 0);
/*
** Exchange buffer address, tgt_cntr address and
** hdr_hndlr address and completion handler address
** of every task. Collective calls
*/
rc = LAPI_Address_init(t_hndl, t_buf, global_addr);
rc = LAPI_Address_init(t_hndl, &t_cntr, tgt_addr);
rc = LAPI_Address_init(t_hndl, (void *)&hdr_hndlr,
                    hndlr_addr);
rc = LAPI Address_init(t_hndl, (void *)&do_get,
                    cmpl_hndlr_addr);
if (task_id == 0) { /* Task id is 0 , Origin */
    tgt = task_id + 1;
    for (loop=0;loop<I_MAX;loop++) {/* Update buffer */
            t_buf[loop] = task_id - loop;
    }
            /* Global fence to sync before starting */
    rc = LAPI_Gfence(t_hndl);
    /* Fill in uhdr and udata buffers for AM call */
    t_uhdr.cmpl_hndlr =
                    (compl_hndlr_t *) cmpl_hndlr_addr[1];
    t_uhdr.uinfo    = (int)global_addr[tgt];
    uhdr        = (void *)&t_uhdr;
    uhdrlen     = sizeof(usrhdr_t);
    udata       = (void *) t_buf;
    udatalen    = I_MAX*sizeof(int);
    rc = LAPI_Amsend(t_hndl, tgt, hndlr_addr[tgt],
                    uhdr, uhdrlen, (void *) udata,
                    udatalen, tgt_addr[tgt],
                    &l_cntr, &c_cntr);
    /* Wait for local AM completion */
    rc = LAPI_Waitcntr(t_hndl, &l_cntr, 1, &cur_val);
    /* Can now change local buffer */
    for (loop=0;loop<I_MAX;loop++) {/* Update buffer */
            t_buf[loop] = loop * task_id;
    }
    /* Wait for target AM completion */
    rc = LAPI_Waitcntr(t_hndl, &c_cntr, 1, &cur_val);
    printf("Node %d, done issuing AM to node %d\n",
                    task_id, tgt);
    rc = LAPI_Gfence(t_hndl);
    rc = LAPI_Get(t_hndl,tgt,I_MAX*sizeof(int),
                    global_addr[tgt],(void *)t_buf,
                    tgt_addr[tgt],&l_cntr);
    /* Wait for local Get completion */
    rc = LAPI_Waitcntr(t_hndl, &l_cntr, 1, NULL);
    printf("Node %d, done issuing Get from node %d\n",
                    task_id, tgt);
    printf("Result of Get after the Am from node %d:\n",
                    tgt);
    for (loop=0;loop<I_MAX;loop++) {/* Update buffer */
            printf("Val[%d] = %d\n", loop, t_buf[loop]);
    }
} else { /* Task id is 1 , Target */
    tgt = task_id - 1;
    for (loop=0;loop<I_MAX;loop++){/* Zero out buffer */
            t_buf[loop] = 0;
    }
            /* Global fence to sync before starting */
rc = LAPI_Gfence(t_hndl);
```

```
/* Process AM */
rc = LAPI_Getcntr(t_hndl, &t_cntr, &val);
while (val < 1) {
            sleep(1); /* Do some work */
                    /* Poll the adapter once */
            rc = LAPI_Probe(t_hndl);
            rc = LAPI_Getcntr(t_hndl, &t_cntr, &val);
}
/* To reset the t_cntr value */
rc = LAPI_Waitcntr(t_hndl, &t_cntr, 1, &cur_val);
printf("Node %d, done doing work and "
            "processing AM\n", task_id);
while (!cont) {
            sleep(1); /* Do some work */
}
rc = LAPI_Gfence(t_hndl);
/* Process Get */
rc = LAPI_Getcntr(t_hndl, &t_cntr, &val);
while (val < 1) {
            sleep(1); /* Do some work */
                    /* Poll the adapter once */
            rc = LAPI_Probe(t_hndl);
            rc = LAPI_Getcntr(t_hndl, &t_cntr, &val);
}
/* To reset the t_cntr value */
rc = LAPI_Waitcntr(t_hndl, &t_cntr, 1, &cur_val);
printf("Node %d, done doing work and "
            "processing Get\n", task_id);
}
            /* Global fence to sync before terminating job */
rc = LAPI_Gfence(t_hndl);
rc = LAPI_Term(t_hndl);
}
```

Following is a list of subroutines and their definitions usable with LAPI of the present invention. These subroutine definitions will be understood by those skilled in the art for use in the present implementation of LAPI.

Initialization and Termination

Initialize LAPI

LAPI_Init, LAPI_INIT Function

Purpose

Initialize the LAPI subsystem.

C Syntax

```
#include <lapi.h>
int LAPI_Init(hndl, lapi_info)
    lapi_handle_t   *hndl;
    lapi_info_t     *lapi_info;
```

Parameters

| | | |
|---|---|---|
| hndl | - OUT | A handle that specifies a particular LAPI context. This parameter can not be NULL. |
| lapi_info | - IN/OUT | A structure that provides the parallel job info that this LAPI context is associated with. This parameter can not be NULL. |

Description

This function instantiates a new context of LAPI subsystem and initializes it. A handle to the newly created LAPI context is returned in hndl. All subsequent LAPI calls can use hndl to specify the context of the LAPI operation.

lapi_info structure (lapi_info_t) needs to be filled in:
```
typedef struct { /* Not in use currently */
    lapi_dev_t      protocol;     /* OUT - Which
                                     protocol is initialized */
    int             info2;        /* Future support */
    int             info3;        /* Future support */
    int             info4;        /* Future support */
    int             info5;        /* Future support */
    int             info6;        /* Future support */
    LAPI_err_hndlr  *err_hndlr;   /* IN - User
                                     registered error handler */
    void            *info_info2;  /* Future support */
    void            *info_info3;  /* Future support */
    void            *info_info4;  /* Future support */
} lapi_info_t;
``` lapi_dev_t is defined as follows:

```
typedef enum {NULL_DEV=0, TB2_DEV, TB3_DEV, UDP_DEV,
    VIRTUAL_DEV, LAST_DEV} lapi_dev_t;
```

NOTE: Only TB3_DEV lapi_dev_t type is suppoted in this release. User can register an error handler through lapi_info structure. The user needs to create a function with the following parameters:

```
void (User func name) (lapi_handle_t *hndl,/* LAPI
                                              handle */
    int *error_code, /* Error code */
    lapi_err_t *err_type,/* GET/PUT/RMW/AM/INTERNAL*/
    int *task_id,    /* Current node */
    int *src);       /* Source node */
```

Error code(*error_code) of LAPI_ERR_TIMEOUT is a recoverable error if the user chooses to ignore it in the user's error handler. All other error codes are currently terminal and the user should do clean up processing of user's process and terminate the process (i.e. exit( )).

Except for LAPI_Address( ) and LAPI_Msg_string( ), it is an error to make any LAPI calls before calling LAPI_Init( ).

Return Values

LAPI_SUCCESS—on successful completion.

The following can be returned on error:
EBUSY—System error—Previous job still running.
EINVAL—System error—Invalid argument.
EPERM—System error—caller not authorized to perform the action.
ETIMEDOUT—System error—Switch network is not up.
ENODEV—System error—Adapter type and library do not match.
ENOSPC—System error—Can not attach to bus memory
out of memory or segment register.
CSS_KE_INTERNAL_ERROR—System error—Kernel extension internal memory management failed.
CSS_KE_UCODE_ERROR—System error—Adapter micro code is not responding.
LAPI_ERR_UNKNOWN_DEVICE—Not supported device.
LAPI_ERR_NOMORE_PORTS—No more communication ports are available.
LAPI_ERR_INIT_FAILED—Initialization failed.
LAPI_ERR_OPEN_FAILED—Opening of communication device failed.
LAPI_ERR_BAD_PARAMETER—Invalid parameter passed in.

Related Information

LAPI_Term.

Terminate the LAPI context

LAPI_Term, LAPI_TERM Function

Purpose

Terminate and cleanup the LAPI subsystem.

C Syntax

```
#include <.lapi.h>
int LAPI_Term(hndl)
    lapi_handle_t hndl;
```

Parameters hndl - IN    The handle that specifies a particular LAPI context.

Description

This function terminates the LAPI context specified by hndl. Any LAPI notification threads associated with this context will be terminated. It is an error to make any LAPI calls using hndl after LAPI_Term( ) has been called, except for LAPI_Msg_string( ) and LAPI_Address( ).

Return Values

LAPI_SUCCESS—on successful completion.

The following can be returned on error:
EINVAL—System error—Invalid argument.
EPERM—System error—caller not authorized to perform the action.
LAPI_ERR_CLOSE_FAILED—Close of communication device failed.
LAPI_ERR_BAD_PARAMETER—Invalid parameter passed in.

Related Information

LAPI_Init.

Return Message string, Query and Set LAPI Environment Functions

Get LAPI message string.

LAPI_Msg_string, LAPI_MSG_STRING Function

Purpose

Get LAPI and System Message String.

C Syntax

```
#include <lapi.h>
LAPI_Msg_string(error_code, buf)
    int   error_code;
    void * buf;
```

Parameters

| error_code | - IN | The return value of a previous LAPI call. |
|---|---|---|
| buf | - OUT | Buffer to store the message string. |

Description

This function returns the message string representation of the return value for a specific LAPI call.

Return Values

LAPI_SUCCESS—on successful completion.

The following can be returned on error:
LAPI_ERR_BAD_PARAMETER—Invalid parameter passed in.

Related Information

LAPI_Init, LAPI_Term.

Query LAPI Environment.

LAPI_Qenv, LAPI_QENV Function

Purpose

Query the LAPI interface for parallel job information.

C Syntax

```
#include <lapi.h>
int LAPI_Qenv(hndl, query, ret_val)
    lapi_handle_t hndl;
    lapi_query_t query;
    int       *ret_val;
```

Parameters

| hndl | - IN | The handle that specifies a particular LAPI context. |
|---|---|---|
| query | - IN | Type of query requested as defined by lapi_query_t in lapi.h. |
| ret_val | - OUT | The integer value of the query request. This parameter can not be NULL. |

Description

This function queries the LAPI interface for information about a specific LAPI instance.

lapi_query_t defines the types of LAPI queries available.

| typedef enum | {TASK_ID=0, | /* Query task id of current task in job */ |
|---|---|---|
| | NUM_TASKS, | /* Query number of tasks in job */ |
| | MAX_UHDR_SZ, | /* Query max. user header size for AM */ |
| | MAX_DATA_SZ, | /* Query max. data length that can be sent */ |
| | ERROR_CHK, | /* Query & Set parameter checking on(1)/off(0) */ |
| | TIMEOUT, | /* Query & Set current comm. timeout setting */ |
| | MIN_TIMEOUT, | /* Query minimum comm. timeout setting */ |
| | MAX_TIMEOUT, | /* Query maximum comm. timeout setting */ |
| | INTERRUPT_SET, | /* Query & Set interrupt on(1)/off(0) */ |
| | MAX_PORTS, | /* Query max. available comm. ports */ |
| | MAX_PKT_SZ, | /* This is the payload size of 1 packet */ |
| | NUM_REX_BUFS, | /* Number of retransmission buffers */ |
| | REX_BUF_SZ, | /* Size of Each retransmission buffer in bytes */ |
| | LAST_QUERY} | lapi_query_t; |

Return Values

LAPI_SUCCESS—on successful completion.

The following can be returned on error:
LAPI_ERR_BAD_PARAMETER—Invalid parameter passed in.

Related Information

LAPI_Amsend, LAPI_Get, LAPI_Put, LAPI_Senv.

Set LAPI Environment.

LAPI_Senv, LAPI_SENV Function

Purpose

Set the LAPI environment for given context.

C Syntax

```
#include <lapi.h>
init LAPI_Senv(hndl, query, set_val)
    lapi_handle_t hndl;
    lapi_query_t query;
    int       set_val;
```

Parameters

| hndl | - IN | The handle that specifies a particular LAPI context. |
|---|---|---|
| set_lapi_env | - IN | LAPI set environment type as defined by lapi_query_t in lapi.h. |
| set_val | - IN | The integer value to set the LAPI environment. |

Description

This function sets the LAPI environment for specific LAPI instance. lapi_query_t defines the types of LAPI set environment variables.

| typedef enum { . . . | | |
|---|---|---|
| | ERROR_CHK, | /* Query & Set parameter checking on(1)/off(0) */ |
| | TIMEOUT, | /* Query & Set current comm. timeout setting */ |
| | INTERRUPT_SET, | /* Query & Set interrupt on(1)/off(0) */ |
| | . . . } lapi_query_t; | |

NOTE: If ERROR_CHK is set to 0 then for all LAPI calls parameter error checking are ignored (i.e. LAPI_ERR_BAD_PARAMETER is not returned).

Return Values

LAPI_SUCCESS—on successful completion.

The following can be returned on error:
LAPI_ERR_BAD_PARAMETER—Invalid parameter passed in.

Related Information
   LAPI_Qenv.
Basic Data Transfer Calls
Direct Put
LAPI_Put, LAPI_PUT Function
Purpose
   Put data into target address on a target process.
C Syntax

```
#include <lapi.h>
int LAPI_Put(hndl, tgt, len, tgt_addr, org_addr,
             tgt_cntr, org_cntr, cmpl_cntr)
    lapi_handle_t  hndl;
    uint           tgt;
    uint           len;
    void           *tgt_addr;
    void           *org_addr;
    lapi_cntr_t    *tgt_cntr;
    lapi_cntr_t    *org_cntr;
    lapi_cntr_t    *cmpl_cntr;
```

Parameters

| | | |
|---|---|---|
| hndl | - IN | The handle specifying the LAPI context. |
| tgt | - IN | The target task number. This parameter is valid from 0=<tgt<LAPI_Qenv(,NUM_TASKS,)-1. |
| len | - IN | The number of bytes to be transferred. This parameter is valid from 0=<len<LAPI_Qenv(,MAX_DATA_SZ,). |
| tgt_addr | - IN | The address on target process where data is to be copied into. This parameter can be NULL only if len=0. |
| org_addr | - IN | The address on the origin process where data is to be copied from. This parameter can be NULL only if len=0. |
| tgt_cntr | - IN | The address of target counter. The target counter will be incremented after data has arrived at the target. If the parameter is NULL, this counter will not be updated. |
| org_cntr | - IN/OUT | The address of origin counter. The origin counter will be incremented after data is copied out of origin address. If the parameter is NULL, this counter will not be updated. |
| cmpl_cntr | - IN/OUT | The address of completion counter that is reflection of the tgt_cntr. This counter will be incremented at the origin after tgt_cntr is incremented. If the parameter is NULL, counter will not be updated. |

Description
   This function transfers len number of bytes from virtual address org_addr on the origin to the target process tgt at the address tgt_addr over the port identified by hndl. After the data has been copied out of the memory at org_addr the org_cntr is incremented. After the data has arrived at the tgt, the tgt_cntr is incremented. If either counter address is NULL, the data transfer happens, but the corresponding counter increment do not take place. This is a non blocking call, in that, the calling program may not assume that origin buffer may be changed, nor that contents of the memory pointed to by tgt_addr on tgt is ready for use. However, after the origin waits for the org_cntr update to complete, the origin can modify the origin buffer org_addr. Similarly, the target can modify the data in the target buffer tgt_addr after it has waited for tgt_cntr update to complete on the target. This call can be made synchronous if the origin waits for the cmpl_cntr update to complete.
Return Values
   LAPI_SUCCESS—on successful completion.
   The following can be returned on error:
      LAPI_ERR_BAD_PARAMETER—Invalid parameter passed in.
Related Information
   LAPI_Fence, LAPI_Get, LAPI_Getcntr, LAPI_Gfence,
   LAPI_Qenv, LAPI_Waitcntr.
Direct Get
LAPI_Get, LAPI_GET Function
Purpose
   Copy data from a remote process to the local address on local process.
C Syntax

```
#include <lapi.h>
int LAPI_Get(hndl, tgt, len, tgt_addr, org_addr,
             tgt_cntr, org_cntr)
    lapi_handle_t  hndl;
    uint           tgt;
    uint           len;
    void           *tgt_addr;
    void           *org_addr;
    lapi_cntr_t    *tgt_cntr;
    lapi_cntr_t    *org_cntr;
```

Parameters

| | | |
|---|---|---|
| hndl | - IN | The handle specifying the LAPI context. |
| tgt | - IN | Target task which is the source of the data. This parameter is valid from 0=<tgt<LAPI_Qenv(,NUM_TASKS,)-1. |
| len | - IN | The number of bytes of data to be copied. This parameter is valid from 0=<len<LAPI_Qenv(,MAX_DATA_SZ,). |
| tgt_addr | - IN | Target buffer address of the data source. This parameter can be NULL only if len=0. |
| org_addr | - IN/OUT | Local buffer address that the received data is copied into. This parameter can be NULL only if len=0. |
| tgt_cntr | - IN | The address of target counter. The target counter will be incremented after data has been copied out of the target buffer. If the parameter is NULL, this counter will not be updated. |
| org_cntr | - IN/OUT | The address of origin counter. The origin counter will be incremented after data has arrived at the origin. If the parameter is NULL, this counter will not be updated. |

Description
   Use this subroutine to transfers len number of bytes from tgt_addr address at the target process to the org_addr virtual address at the origin process over the port identified by hndl. After the data is copied out of the memory at tgt_addr, the tgt_cntr is incremented. After the data arrives at the origin, the org_cntr is incremented. If either counter address is NULL, the data transfer occurs, but the corresponding counter increment does not take place. This is a non blocking call in that the calling program (all processes associated with the program including the local and remote processes involved) can not assume that the target buffer can be changed, nor that contents of the memory pointed to by org_addr on the origin is ready for use. However, after the origin waits for the org_cntr update to complete, the origin can use the org_addr data. Similarly, the target can reuse the target buffer tgt_addr only after it has waited for the tgt_cntr update to complete at the target.

Return Values

LAPI_SUCCESS—on successful completion.

The following can be returned on error:

LAPI_ERR_BAD_PARAMETER—Invalid parameter passed in.

Related Information

None.

Related Information

LAPI_Fence, LAPI_Getcntr, LAPI_Gfence, LAPI_Put,

LAPI_Qenv, LAPI_Waitcntr.

Get, Wait, Set and Probe Operations

Get Counter Operation

LAPI_Getcntr, LAPI_GETCNTR Function

Purpose

Gets the integer value of counter.

C Syntax

```
#include <lapi.h>
int LAPI_Getcntr(hndl, cntr, val)
    lapi_handle_t hndl;
    lapi_cntr_t   *cntr;
    int           *val;
```

Parameters

| hndl | - IN  | The handle specifying the LAPI context. |
| cntr | - IN  | Address of the counter. This parameter can not be NULL. |
| val  | - OUT | Stores the integer value of counter. This parameter can not be NULL. |

Description

Gets the integer value of cntr. This can be used to see how much progress is being made in LAPI context hndl.

In conjunction, LAPI_Probe( ) can be used to make progress in LAPI context hndl if LAPI_Getcntr( ) is called inside a loop.

Return Values

LAPI_SUCCESS—on successful completion.

The following can be returned on error:

LAPI_ERR_BAD_PARAMETER—Invalid parameter passed in.

Related Information

LAPI_Amsend, LAPI_Get, LAPI_Probe, LAPI_Put, LAPI_Setcntr, LAPI_Waitcntr.

Wait Counter Operation

LAPI_Waitcntr, LAPI_WAITCNTR Function

Purpose

Waits till a specified counter reaches the value specified.

C Syntax

```
#include <lapi.h>
int LAPI_Waitcntr(hndl, cntr, val, cur_cntr_val)
    lapi_handle_t hndl;
    lapi_cntr_t   *cntr;
    int           val;
    int           *cur_cntr_val;
```

Parameters

| hndl | - IN | The handle specifying the LAPI context. |
| cntr | - IN | The address of the counter to be waited on. This parameter can not be NULL. |
| val  | - IN | The value the counter needs to reach. |
| cur_cntr_val | - OUT | The integer value of current counter. This parameter can be NULL. |

Description

This function waits till the cntr reaches or exceeds the specified val. Once the cntr reaches the val, the cntr is decremented by that value. (we say decremented rather than set to zero since the cntr could has had a value greater than the specified val, when the call was made). This call may or may not check for message arrivals over the LAPI context hndl; LAPI_Probe will always check for message arrivals.

Return Values

LAPI_SUCCESS—on successful completion.

The following can be returned on error:

LAPI_ERR_BAD_PARAMETER—Invalid parameter passed in.

Related Information

LAPI_Amsend, LAPI_Get, LAPI_Getcntr, LAPI_Probe,

LAPI_Put, LAPI_Rmw, LAPI_Setcntr.

Set Counter Operation

LAPI_Setcntr, LAPI_SETCNTR Function

Purpose

Sets a counter to a specified value.

C Syntax

```
#include <lapi.h>
int LAPI_Setcntr(hndl, cntr, val)
    lapi_handle_t hndl;
    lapi_cntr_t   *cntr;
    int           val;
```

Parameters

| hndl | - IN | The handle specifying the LAPI context. |

| | | |
|---|---|---|
| cntr | - IN/OUT | The address of the counter to be set. This parameter can not be NULL. |
| val | - IN | The value the counter needs to be set to. |

Description

This function sets the cntr to the appropriate value.

The LAPI context associated with hndl may or may not be polled for incoming messages.

Return Values

LAPI_SUCCESS—on successful completion.

The following can be returned on error:
LAPI_ERR_BAD_PARAMETER—Invalid parameter passed in.

Related Information

LAPI_Getcntr, LAPI_Probe, LAPI_Waitcntr.

LAPI Probe

LAPI_Probe, LAPI_PROBE Function

Purpose

To transfer control to the communications subsystem to check for arriving messages and to make progress in polling mode.

C Syntax

```
#include <lapi.h>
int LAPI_Probe(hndl)
lapi_handle_t hndl;
```

Parameters

| | | |
|---|---|---|
| hndl | - IN | The handle specifying the LAPI context. |

Description

This function transfers control to the communications subsystem in order to make progress on messages associated with the context hndl. Note that no guarantees are made about receipt of messages on the return from this function.

Return Values

LAPI_SUCCESS—on successful completion.

The following can be returned on error:
LAPI_ERR_BAD_PARAMETER—Invalid parameter passed in.

Related Information

LAPI_Getcntr, LAPI_Waitcntr, LAPI_Setcntr.

Read-Modify-Write Operations

LAPI_Rmw, LAPI_RMW Function

Purpose

This function provides the synchronization primitives.

C Syntax

```
#include <lapi.h>
int LAPI_Rmw(hndl, op, tgt, tgt_var, in_val,
    prev_tgt_val, org_cntr)
lapi_handle_t hndl;
RMW_ops_t    op;
uint         tgt;
int          *tgt_var;
int          *in_val;
int          *prev_tgt_val;
lapi_cntr_t  *org_cntr;
```

Parameters

| | | |
|---|---|---|
| hndl | - IN | The handle specifying the LAPI context. |
| op | - IN | The operation to be performed. |
| tgt | - IN | The target task on which the RMW variable resides. This parameter is valid from 0=<tgt<LAPI_Qenv (,NUM_TASKS,). |
| tgt_var | - IN | The target RMW variable address. This parameter can not be NULL. |
| in_val | - IN | The value input to the op. This parameter can not be NULL. |
| prev_tgt_val | - IN/OUT | The location at the origin in which previous tgt_var on the target process is stored before the RMW op is executed. This parameter can be NULL. |
| org_cntr | - IN/OUT | The address of origin counter. The origin counter will be incremented after data is copied out of origin address. If the parameter is NULL, this counter will not be updated. |

Description

The LAPI_Rmw function is used to synchronize two independent operations such as two processes sharing a common data structure. The operation is performed at the tgt target process and is atomic. The operation takes a in_val from the origin and performs one of four selected op operations on a tgt_var variable at the tgt target and replaces the tgt_var target variable with the results of the op operation. The prev_tgt_val original value of the tgt_var target variable is returned to the origin.

The valid operations for op are:
FETCH_AND_ADD
FETCH_AND_OR
SWAP
COMPARE_AND_SWAP.

The operations are performed over the context referred to by hndl. The outcome of the execution of these calls is as if the following code was executed atomically.

```
*prev_tgt_val=*tgt_var;
```

```
*tgt_var=f(*tgt_var, *in_val);
``` where f(a; b)=a+b for FETCH_AND_ADD,
f(a; b)=a|b for FETCH_AND_OR (bitwise or),
and f(a; b)=b for SWAP.

For COMPARE_AND_SWAP in_val is treated as a pointer to an array of two integers, and the op is the following atomic operation.

```
if(*tgt_var == in_val[0]) {
    *prev_tgt_val = TRUE;
```

```
    *tgt_var = in_val[1];
} else {
    *prev_tgt_val = FALSE;
}
```

All the calls are nonblocking. Testing for completion is by using LAPI_Getcntr and LAPI_Waitcntr functions described above. There is no tgt_cntr on RMW calls, and they do not provide any indication of completion on the tgt process.

Return Values

LAPI_SUCCESS—on successful completion.

The following can be returned on error:
LAPI_ERR_BAD_PARAMETER—Invalid parameter passed in.

Related Information

LAPI_Getcntr, LAPI_Probe, LAPI_Qenv,
LAPI_Setcntr, LAPI_Waitcntr.

Fence Calls

Local fence

LAPI_Fence, LAPI_FENCE Function

Purpose

This function is used to enforce order on LAPI calls.

C Syntax

```
#include <lapi.h>
int LAPI_Fence(hndl)
lapi_handle_t hndl;
```

Parameters hndl - IN  The handle specifying the LAPI context.

Description

If a process calls LAPI_Fence( ), all the LAPI operations that were initiated by that process before the fence using the LAPI context hndl are guaranteed to complete at the target processes before any of its communication operations using hndl initiated after the fence complete at the target processes. This is a data fence which means that the data movement is complete. This is not an operation fence which would need to include Active Message completion handlers completing on the target.

Return Values

LAPI_SUCCESS—on successful completion.

The following can be returned on error:
LAPI_ERR_BAD_PARAMETER—Invalid parameter passed in.

Related Information

LAPI_Amsend, LAPI_Get, LAPI_Gfence, LAPI_Put, LAPI_Rmw.

Global Fence

LAPI_Gfence, LAPI_GFENCE Function

Purpose

This function is used to enforce order on LAPI calls on all processes.

C Syntax

```
#include <lapi.h>
in LAPI_Gfence(hndl)
lapi_handle_t hndl;
```

Parameters hndl - IN  The handle specifying the LAPI context.

Description

This is a collective call. On completion of this call, it is assumed that all LAPI communication associated with hndl from all processes has quiesced. Note that although hndl is a local variable, it has a set of nodes that were associated with it at LAPI_Init all of which have to participate in this operation for it to complete. This is a data fence which means that the data movement is complete. This is not an operation fence which would need to include Active Message completion handlers completing on the target.

Return Values

LAPI_SUCCESS—on successful completion.

The following can be returned on error:
LAPI_ERR_BAD_PARAMETER—Invalid parameter passed in.

Related Information

LAPI_Fence.

Exchanging Virtual Addresses

All LAPI data transfer calls are required to provide virtual addresses on the target processes. How does a process know the virtual addresses of objects on other processes?

In the case of SPMD programs it may be possible to assume that all processes have the same virtual address map. In such cases, one may assume that the local virtual address of a static object (global variables in C or fortran common blocks) is the same as the virtual address of the same object on a different process. This assumption is Operating System dependent, and is true under the current versions of AIX. However, AIX has the ability to relocate static data objects when an executable file is loaded and, this assumption may not be valid on future versions of AIX.

Get and Put can be used to move addresses, but in order to do so, there needs to be a mechanism provided for boot-strapping. If all processes could agree on a specific virtual address where they place an array of pointers to objects of interest, then a process could simply get the appropriate address from this table by indexing with respect to the address of the array of pointers. This approach may not work in non-SPMD programs, where it may not be possible to agree on such a specific address.

To solve this problem, the following function in LAPI is defined, which is a collective communication operation, that basically collects one address from each process and distributes all the addresses to all the processes.

LAPI_Address_init, LAPI_ADDRESS_INIT Function

Purpose

To exchange virtual addresses for non SPMD programs and for dynamically allocated data.

C Syntax

```
#include <lapi.h>
int LAPI_Address_init(hndl, my_addr, add_tab)
lapi_handle_t hndl;
void    *my_addr;
void    *add_tab[];
```

Parameters

| | | |
|---|---|---|
| hndl | - IN | The handle specifying the LAPI context. |
| my_addr | - IN | The entry supplied by each process. This parameter can be NULL. |
| add_tab | - IN/OUT | The address table containing the addresses supplied by all processes. This parameter can not be NULL. |

Description
    This function is used to exchange virtual and dynamically allocated addresses. add_tab is an array of pointers of size LAPI_Qenv(,NUM_TASKS,). This function is a collective call over the LAPI context hndl which fills the table add_tab with the entries supplied by each task. Upon completion of this call, add_tab[i] will contain the entry provided by task i.

Return Values
    LAPI_SUCCESS—on successful completion.
    The following can be returned on error:
        LAPI_ERR_BAD_PARAMETER—Invalid parameter passed in.

Related Information
    None.

Generic Active Message Functions
    The LAPI library provides a generic Active Message function as a means to allow users to extend the base set of LAPI functions. The Active Message function simply provides a means to call a user written handler.

LAPI Active Message
LAPI_Amsend, LAPI_AMSEND Function
Purpose
    To invoke a user provided Active Message (AM) handler to run on a remote (target) process.

C Syntax

```
#include <lapi.h>
typedef void (compl_hndlr_t)(hndl, user_info);
    lapi_handle_t hndl;         LAPI context passed in
                                from LAPI_Amsend.
    void *user_info;            Buffer (user_info) pointer passed
                                in from header handler
                                (void * (hnd_hndlr_t)).
typedef void * (hdr_hndlr_t)(hndl, uhdr, uhdr_len,
                msg_len, comp_h, user_info);
lapi_handle_t   hndl;           LAPI context passed in
                                from LAPI_Amsend.
void *          uhdr;           uhdr passed in from
                                LAPI_Amsend.
uint    uhdr_len;               uhdr_len passed in from
                                LAPI Amsend.
uint *  msg_len;                udata_len passed in from
                                LAPI_Amsend.
compl_hndlr_t **comp_h;         Function address of
                                completion handler
```

| | | |
|---|---|---|
| void | **user_info; | (void (compl_hndlr_t)) that needs to be filled out by this header handler function. Buffer pointer (user_infdo) that is provided by this header handler function to pass to the completion handler. |

```
int LAPI_Amsend(hndl, tgt, hdr_hdl, uhdr, uhdr_len,
                udata, udata_len, tgt_cntr,
                org_cntr, cmpl_cntr)
lapi_handle_t hndl;
uint            tgt;
void            *hdr_hdl;
void            *uhdr;
uint            uhdr_len;
void            *udata;
uint            udata_len;
lapi_cntr_t     *tgt_cntr;
lapi_cntr_t     *org_cntr;
lapi_cntr_t     *cmpl_cntr;
```

Parameters

| | | |
|---|---|---|
| hndl | - IN | The handle specifying the LAPI context. |
| tgt | - IN | The target task number. This parameter is valid from 0=<tgt<LAPI_Qenv(,NUM_TASKS,). |
| hdr_hdl | - IN | The pointer to the remote header handler function to be invoked at the target. This parameter can not be NULL. |
| uhdr | - IN | The pointer to the local header (parameter list) which is passed to the handler function. This parameter can be NULL if uhdr_len = 0. |
| uhdr_len | - IN | This parameter is valid from 0=<uhdr_len<LAPI_Qenv(, MAX_UHDR_SZ,). |
| udata | - IN | Pointer to the user data. This parameter can be NULL if udata_len = 0. |
| udata_len | - IN | Length of the user data in bytes. This parameter is valid from 0=<udata_len<LAPI_Qenv(, MAX_DATA_SZ,). |
| tgt_cntr | - IN | The address of target counter. The target counter will be incremented after data has arrived at the target and after the completion handler completes. If the parameter is NULL, this counter will not be updated. |
| org_cntr | - IN/OUT | The address of origin counter. The origin counter will be incremented after data is copied out of origin address. If the parameter is NULL, this counter will not be updated. |
| cmpl_cntr | - IN/OUT | The counter at the origin that signifies completion of completion handler. It will be updated once completion handler completes. If the parameter is NULL, counter will not be updated. |

Description
    This function transfers hdr_hdl function pointer along with the contents of uhdr and udata from the origin to the target process tgt. When the message arrives at the target process, the header-handler hdr_hdl is invoked at the tgt target with the pointer to uhdr as one of the parameters. The user-supplied header-handler is expected to return a buffer pointer (user_info) as the return value, in which udata is to be copied. The header-handler is also expected to save any information that will be required later by the completion-handler. The header-handler returns (through reference parameters) the completion-handler and a pointer to the saved information (user_info).

Note: that the header-handler should be non-blocking because no progress on the messages associated with hndl can be made until control is returned to the communications library from the header-handler. After the header-handler returns, udata (if any) is copied into the user-specified buffer (user_info). When all of the udata has been copied into the user buffer, the completion-handler specified by the user through the header-handler is enqueued. After the parameters (including contents of uhdr and udata) are copied out of the memory at the origin, the org_cntr is incremented. After the completion-handler has completed execution at the tgt, the tgt_cntr is incremented. If the completion handler specified is a NULL, then tgt_cntr is incremented after all of udata has been copied into the user specified buffers. If the user specified buffer is NULL and the completion handler is also NULL, then tgt_cntr will be incremented in some implementation specific manner. Either counter addresses may be NULL. This is a non blocking call. The calling process cannot change the uhdr origin header and udata data until completion at the origin is signaled by the org_cntr being incremented. Similarly, it can be assumed that the specified AM handler has run at tgt only after the target counter tgt_cntr has been incremented. The cmpl_cntr and tgt_cntr counters will be incremented after the AM handler has completed execution at the target. When the AM handler has both a hdr_hdl header handler and comp_h completion handler, the cmpl_cntr and tgt_cntr counters will be incremented after the completion handler has completed execution. If the AM handler has only a hdr_hdl header handler, the cmpl_cntr and tgt_cntr counters will be incremented after the header handler has completed execution. This call can be made synchronous if the origin waits for the cmpl_cntr update to complete. The length (uhdr_len) of the user specified header is constrained by an implementation specified maximum value (LAPI_Qenv(,MAX_UHDR_SZ,)). In the current implementation, the amount of udata sent per packet is LAPI_Qenv(, MAX_UHDR_SZ,)—uhdr_len. To get the best bandwidth uhdr_len should be as small as possible.

Return Values

LAPI_SUCCESS—on successful completion.

The following can be returned on error:
LAPI_ERR_BAD_PARAMETER—Invalid parameter passed in.

Related Information
LAPI_Fence, LAPI_Getcntr, LAPI_Qenv, LAPI_Waitcntr.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. In a data processing system having a communication system for sending messages from a sender to a receiver, a method for enabling a user to detect the occurrence of communication events, said method comprising:

assigning a user readable counter to a communication event to be monitored;

incrementing the user readable counter when the communication event occurs; and monitoring by the user, the count in said user readable counter to determine when the count has been incremented, thereby detecting the occurrence of the event.

2. The method of claim 1 further comprising sending multiple messages between said sender and said receiver, said multiple messages grouped together to form an event to be detected by the user.

3. The method of claim 1 wherein said monitoring comprises polling said user readable counter to ascertain its value.

4. The method of claim 1 wherein said monitoring comprises sending a signal to the user when the count in said counter reaches a specified value.

5. The method of claim 1 said user readable counter is also user modifiable, said method further comprising before said incrementing step, decrementing by said user, the number in said user readable counter by a specific value, thereby providing to the user, a wait for waiting an indicated number of events.

6. The method of claim 1 further comprising assigning each event of multiple events to respective ones of multiple user readable counters, and monitoring said multiple user readable counters for detecting the occurrence of any of said multiple events.

7. In a data processing system having an origin, an origin buffer, a target, and a target buffer, and a message handling system for sending a message from the origin buffer to the target buffer to be completed at the target, a method of enabling a user to detect the occurrence of events, said method comprising:

selectively associating a user readable origin counter with the origin buffer;

incrementing the user readable origin counter when the message is sent from the origin buffer to the target buffer; and monitoring the count in the user readable origin counter for an increase, thereby enabling the user to detect that the origin buffer is available.

8. The method of claim 7 further comprising:

selectively associating a user readable target counter with the target buffer;

incrementing the user readable target counter when the message is received by the target buffer from the origin buffer; and monitoring the count in said user readable target counter for an increase, thereby enabling the user to detect that the operation on the target buffer is complete.

9. In a data processing system having an origin, an origin buffer, a target, and a target buffer, and a message handling system for sending a message from the origin buffer to the target buffer to be completed at the target, a method comprising:

associating an origin counter with the origin buffer;

incrementing the origin counter when the message is sent from the origin buffer to the target buffer;

monitoring the count in the origin counter for an increase, thereby detecting that the origin buffer is available;

associating a target counter with the target buffer;

incrementing the target counter when the message is received by the target buffer from the origin buffer; and monitoring the count in said target counter for an increase, thereby detecting that the operation on the target buffer is complete;

associating a completion counter with the completion of the message;

sending an increment message from the target to the completion counter when the message is completed at the target;

incrementing the number in the completion counter responsive to said increment message; and monitoring the number in the completion counter to detect an increase, thereby detecting the completion of the message.

10. The method of claim 9 further comprising:

waiting for the increase in the count in said completion counter; and after detecting said increase in the count in said completion counter, sending an additional message from said origin to said target, thereby insuring that the first sent message is complete before sending the additional message.

11. In a data processing system having a communication system for sending messages from a sender to a receiver, an apparatus enabling a user to detect the occurrence of communication events, said apparatus comprising:

a user readable counter;

a low-level application programming interface (LAPI) is programmable by the user, said LAPI having a first operation for associating said user readable counter with an event to be detected, and a second operation for incrementing the user readable counter when the communication event occurs; and a monitoring apparatus for monitoring the count in said counter to determine when the count has been incremented, thereby enabling the user to detect the occurrence of the event.

12. The apparatus of claim 11 further wherein said LAPI associates sending a set number of multiple messages between said sender and said receiver to said user readable counter as a single event to be detected by the user.

13. The apparatus of claim 11 wherein said monitoring apparatus polls said user readable counter to ascertain its value.

14. The apparatus of claim 11 wherein said monitoring apparatus registers a handler associated with the user readable counter which will be invoked when the user readable counter reaches a specified value, said handler raising an interrupt when the count in said user readable counter reaches a specified value.

15. The apparatus of claim 11 wherein said readable counter is modifiable by the user, and said LAPI is programmed by the user to decrement the number in said user readable counter by a specific value, thereby providing to the user, a wait for waiting an indicated number of events.

16. The apparatus of claim 11 further comprising:

multiple user readable counters;

said LAPI assigns a separate event from multiple events to respective ones of said multiple user readable counters; and said monitoring apparatus monitors said multiple user readable counters for enabling a user to detect the occurrence of any of said multiple events.

17. An apparatus for enabling a user to detect the occurrence of communication events in a data processing system, said apparatus comprising:

an origin;

a target;

an origin buffer in said origin;

a target buffer in said target;

a message handling system for sending a message from the origin buffer to the target buffer to be completed at the target;

user readable origin counter;

a low-level application programming interface (LAPI) having an operation for selectively associating said user readable origin counter to said origin buffer, and an incrementing operation for incrementing the count in the user readable origin counter when a message is sent from said origin buffer to said target buffer; and a monitoring apparatus for monitoring the count in said user readable origin counter for an increase, thereby enabling the user to detect that the origin buffer is available.

18. The apparatus of claim 17 further comprising:

a user readable target counter;

said LAPI further having an operation for selectively associating said user readable target counter with said target buffer, and an operation for incrementing said user readable target counter when the message is received by said target buffer from the origin buffer; and said monitoring apparatus monitors the count in said target counter for an increase, thereby enabling the user to detect that the operation on the target buffer is complete.

19. An apparatus for detecting communication events in a data processing system, said apparatus comprising:

an origin;

a target;

an origin buffer in said origin;

a target buffer in said target;

a message handling system for sending a message from the origin buffer to the target buffer to be completed at the target;

an origin counter;

a low-level application programming interface (LAPI) having an operation for associating said origin counter to said origin buffer, and an incrementing operation for incrementing the count in the origin counter when a message is sent from said origin buffer to said target buffer;

a monitoring apparatus for monitoring the count in said origin counter for an increase, thereby detecting that the origin buffer is available, a target counter;

said LAPI further having an operation for associating said target counter with said target buffer, and an operation for incrementing said target counter when the message is received by said target buffer from the origin buffer; and said monitoring apparatus monitors the count in said target counter for an increase, thereby detecting that the operation on the target buffer is complete;

a completion counter;

said LAPI further having an operation for associating said completion counter with the completion of the message, and an operation for sending an increment message from the target to the completion counter when the message is completed at the target; and said monitoring apparatus monitors the number in the completion counter to detect an increase, thereby detecting the completion of the message.

20. A program product recorded on a computer readable media for use in a data processing system having a communication system for sending messages from a sender to a receiver, the program product including a method for enabling a user to detect the occurrence of communication events comprising:

assigning a user readable counter to a communication event to be monitored;

incrementing the user readable counter when the communication event occurs; and monitoring the count in said user readable counter to determine when the count has been incremented, thereby enabling the user to detect the occurrence of the event.

21. The program product of claim 20 further comprising sending multiple messages between said sender and said receiver, said multiple messages grouped together to form an event to be detected.

22. The program product of claim 20 wherein said monitoring comprises polling said user readable counter to ascertain its value.

23. The program product of claim 20 wherein said monitoring comprises sending a signal to the user when the count in said counter reaches a specified value.

24. The program product of claim 20 further comprising before said incrementing step, decrementing the number in said user readable counter by a specific value, thereby providing to the user, a wait for waiting an indicated number of events.

25. The program product of claim 20 further comprising assigning each event of multiple events to respective ones of multiple user readable counters, and monitoring said multiple user readable counters for enabling the user to detect the occurrence of any of said multiple events.

26. A program product recorded on a computer readable media for use in a data processing system having an origin, an origin buffer, a target, and a target buffer, and a message handling system for sending a message from the origin buffer to the target buffer to be completed at the target, the program product including a method enabling a user to detect the occurrence of events comprising:

selectively associating a user readable origin counter with the origin buffer;

incrementing the user readable origin counter when the message is sent from the origin buffer to the target buffer; and monitoring the count in the user readable origin counter for an increase, thereby enabling the user to detect that the origin buffer is available.

27. The program product of claim 26 further comprising:

selectively associating a user readable target counter with the target buffer;

incrementing the user readable target counter when the message is received by the target buffer from the origin buffer; and monitoring the count in said user readable target counter for an increase, thereby enabling a user to detect that the operation on the target buffer is complete.

28. A program product recorded on a computer readable media for use in a data processing system having an origin, an origin buffer, a target, and a target buffer, and a message handling system for sending a message from the origin buffer to the target buffer to be completed at the target, the program product including a method comprising:

associating an origin counter with the origin buffer;

incrementing the origin counter when the message is sent from the origin buffer to the target buffer; and monitoring the count in the origin counter for an increase, thereby detecting that the origin buffer is available;

associating a target counter with the target buffer;

incrementing the target counter when the message is received by the target buffer from the origin buffer; and monitoring the count in said target counter for an increase, thereby detecting that the operation on the target buffer is complete;

associating a completion counter with the completion of the message;

sending an increment message from the target to the completion counter when the message is completed at the target;

incrementing the number in the completion counter responsive to said increment message; and monitoring the number in the completion counter to detect an increase, thereby detecting the completion of the message.

29. The program product of claim 28 further comprising:

waiting for the increase in the count in said completion counter; and after detecting said increase in the count in said completion counter, sending an additional message from said origin to said target, thereby insuring that the first sent message is complete before sending the additional message.

* * * * *